US012615224B2

(12) United States Patent
Goldshtein et al.

(10) Patent No.: US 12,615,224 B2
(45) Date of Patent: Apr. 28, 2026

(54) VOICE WRAPPER(S) FOR EXISTING THIRD-PARTY TEXT-BASED CHATBOT(S)

(71) Applicant: GOOGLE LLC, Mountain View, CA (US)

(72) Inventors: Sasha Goldshtein, Tel Aviv (IL); Yoav Tzur, Tel Aviv (IL); Shlomo Fruchter, Ness Ziona (IL); Gal Moshitch, Jerusalem (IL); ChiTa Tsai, New York, NY (US); Sharon Sultan, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 111 days.

(21) Appl. No.: 18/370,239

(22) Filed: Sep. 19, 2023

(65) Prior Publication Data

US 2025/0097168 A1     Mar. 20, 2025

(51) Int. Cl.
| | |
|---|---|
| *G10L 15/22* | (2006.01) |
| *G10L 13/08* | (2013.01) |
| *H04L 51/02* | (2022.01) |

(52) U.S. Cl.
CPC .............. *H04L 51/02* (2013.01); *G10L 13/08* (2013.01); *G10L 15/22* (2013.01); *G10L 2015/225* (2013.01)

(58) Field of Classification Search
CPC ................................ G10L 15/22; H04L 51/02
See application file for complete search history.

(56) References Cited

U.S. PATENT DOCUMENTS

| | | | | |
|---|---|---|---|---|
| 2008/0147406 A1* | 6/2008 | Da Palma | ............... | H04L 51/02 |
| | | | | 704/E15.04 |
| 2022/0180874 A1* | 6/2022 | Pugliese | ............... | H04L 51/066 |

FOREIGN PATENT DOCUMENTS

WO          2023038654 A1     3/2023

OTHER PUBLICATIONS

European Patent Office; International Search Report and Written Opinion issued in Application No. PCT/US2024/045812; 17 pages; dated Jan. 7, 2025.

(Continued)

*Primary Examiner* — Jialong He

(74) *Attorney, Agent, or Firm* — Gray Ice Higdon

(57) ABSTRACT

Implementations are directed to providing a voice wrapper to an existing third-party text-based chatbot to enable the existing third-party text-based chatbot to engage in corresponding voice-based conversations. The voice wrapper can include a plurality of components. For instance, the voice wrapper can include a plurality of input components for utilization in responding to a spoken utterance, and in lieu of the existing third-party text-based chatbot, and/or to modify input to be provided to the existing third-party text-based chatbot in responding to the spoken utterance. Also, for instance, the voice wrapper can include a plurality of output components for utilization in responding to the spoken utterance, to reduce perceived latency of the existing third-party text-based chatbot, and/or to modify output generated by the existing third-party text-based chatbot in responding to the spoken utterance.

19 Claims, 7 Drawing Sheets

(56)     References Cited

OTHER PUBLICATIONS

Wang, X. et al., "SwitchGPT: Adapting Large Language Models for Non-Text Outputs"; arXiv.org, Cornell University; arXiv:2309.07623; 15 pages; dated Sep. 14, 2023.
European Patent Office; Invitation to Pay Additional Fees issued in Application No. PCT/US2024/045812; 10 pages; dated Nov. 5, 2024.

* cited by examiner

300

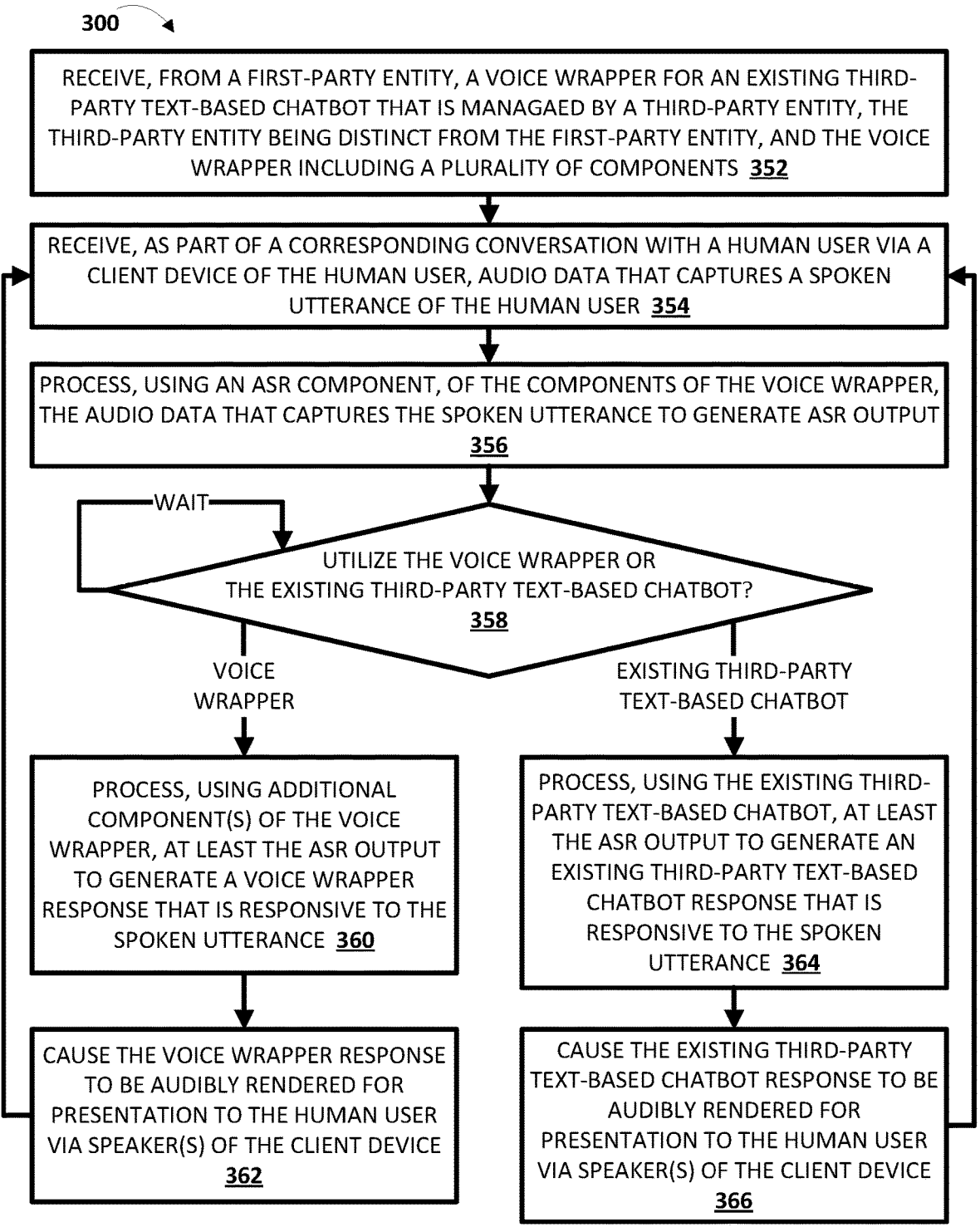

RECEIVE, FROM A FIRST-PARTY ENTITY, A VOICE WRAPPER FOR AN EXISTING THIRD-PARTY TEXT-BASED CHATBOT THAT IS MANAGAED BY A THIRD-PARTY ENTITY, THE THIRD-PARTY ENTITY BEING DISTINCT FROM THE FIRST-PARTY ENTITY, AND THE VOICE WRAPPER INCLUDING A PLURALITY OF COMPONENTS 352

RECEIVE, AS PART OF A CORRESPONDING CONVERSATION WITH A HUMAN USER VIA A CLIENT DEVICE OF THE HUMAN USER, AUDIO DATA THAT CAPTURES A SPOKEN UTTERANCE OF THE HUMAN USER 354

PROCESS, USING AN ASR COMPONENT, OF THE COMPONENTS OF THE VOICE WRAPPER, THE AUDIO DATA THAT CAPTURES THE SPOKEN UTTERANCE TO GENERATE ASR OUTPUT 356

WAIT

UTILIZE THE VOICE WRAPPER OR THE EXISTING THIRD-PARTY TEXT-BASED CHATBOT? 358

VOICE WRAPPER

EXISTING THIRD-PARTY TEXT-BASED CHATBOT

PROCESS, USING ADDITIONAL COMPONENT(S) OF THE VOICE WRAPPER, AT LEAST THE ASR OUTPUT TO GENERATE A VOICE WRAPPER RESPONSE THAT IS RESPONSIVE TO THE SPOKEN UTTERANCE 360

PROCESS, USING THE EXISTING THIRD-PARTY TEXT-BASED CHATBOT, AT LEAST THE ASR OUTPUT TO GENERATE AN EXISTING THIRD-PARTY TEXT-BASED CHATBOT RESPONSE THAT IS RESPONSIVE TO THE SPOKEN UTTERANCE 364

CAUSE THE VOICE WRAPPER RESPONSE TO BE AUDIBLY RENDERED FOR PRESENTATION TO THE HUMAN USER VIA SPEAKER(S) OF THE CLIENT DEVICE 362

CAUSE THE EXISTING THIRD-PARTY TEXT-BASED CHATBOT RESPONSE TO BE AUDIBLY RENDERED FOR PRESENTATION TO THE HUMAN USER VIA SPEAKER(S) OF THE CLIENT DEVICE 366

Figure 4:
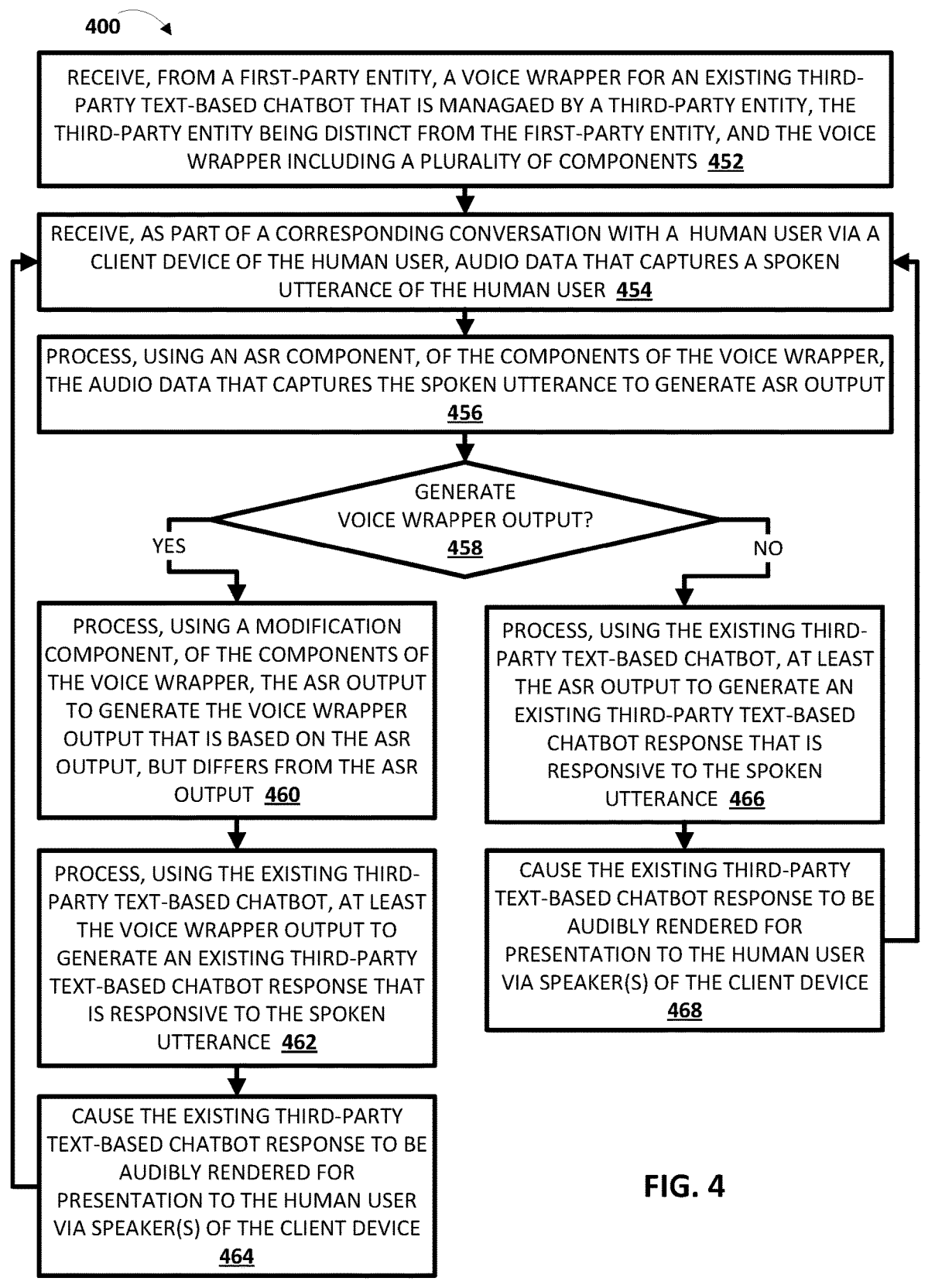

RECEIVE, FROM A FIRST-PARTY ENTITY, A VOICE WRAPPER FOR AN EXISTING THIRD-PARTY TEXT-BASED CHATBOT THAT IS MANAGAED BY A THIRD-PARTY ENTITY, THE THIRD-PARTY ENTITY BEING DISTINCT FROM THE FIRST-PARTY ENTITY, AND THE VOICE WRAPPER INCLUDING A PLURALITY OF COMPONENTS 452

RECEIVE, AS PART OF A CORRESPONDING CONVERSATION WITH A HUMAN USER VIA A CLIENT DEVICE OF THE HUMAN USER, AUDIO DATA THAT CAPTURES A SPOKEN UTTERANCE OF THE HUMAN USER 454

PROCESS, USING AN ASR COMPONENT, OF THE COMPONENTS OF THE VOICE WRAPPER, THE AUDIO DATA THAT CAPTURES THE SPOKEN UTTERANCE TO GENERATE ASR OUTPUT 456

GENERATE VOICE WRAPPER OUTPUT? 458

YES

NO

PROCESS, USING A MODIFICATION COMPONENT, OF THE COMPONENTS OF THE VOICE WRAPPER, THE ASR OUTPUT TO GENERATE THE VOICE WRAPPER OUTPUT THAT IS BASED ON THE ASR OUTPUT, BUT DIFFERS FROM THE ASR OUTPUT 460

PROCESS, USING THE EXISTING THIRD-PARTY TEXT-BASED CHATBOT, AT LEAST THE ASR OUTPUT TO GENERATE AN EXISTING THIRD-PARTY TEXT-BASED CHATBOT RESPONSE THAT IS RESPONSIVE TO THE SPOKEN UTTERANCE 466

PROCESS, USING THE EXISTING THIRD-PARTY TEXT-BASED CHATBOT, AT LEAST THE VOICE WRAPPER OUTPUT TO GENERATE AN EXISTING THIRD-PARTY TEXT-BASED CHATBOT RESPONSE THAT IS RESPONSIVE TO THE SPOKEN UTTERANCE 462

CAUSE THE EXISTING THIRD-PARTY TEXT-BASED CHATBOT RESPONSE TO BE AUDIBLY RENDERED FOR PRESENTATION TO THE HUMAN USER VIA SPEAKER(S) OF THE CLIENT DEVICE 468

CAUSE THE EXISTING THIRD-PARTY TEXT-BASED CHATBOT RESPONSE TO BE AUDIBLY RENDERED FOR PRESENTATION TO THE HUMAN USER VIA SPEAKER(S) OF THE CLIENT DEVICE 464

Figure 5:
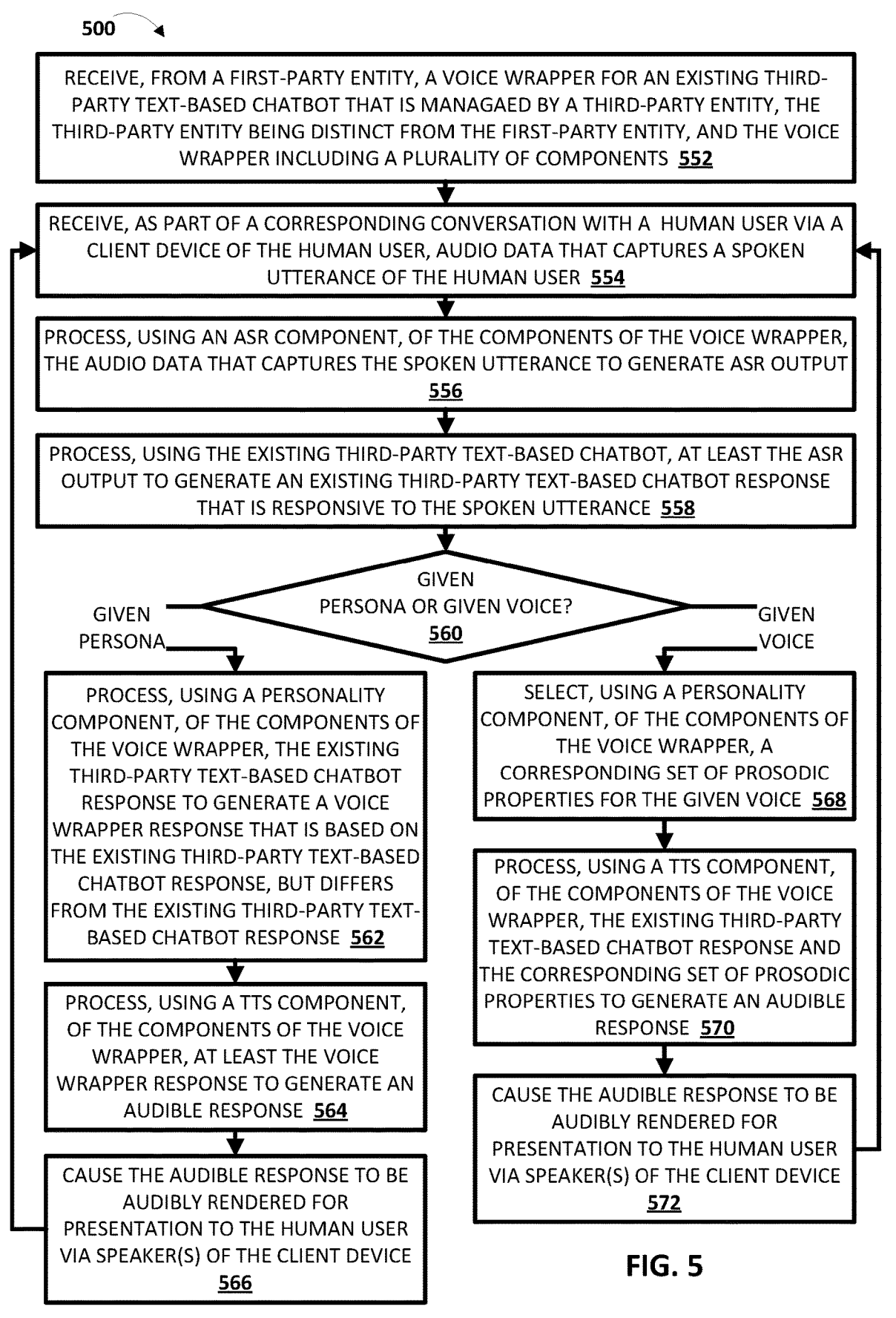

RECEIVE, FROM A FIRST-PARTY ENTITY, A VOICE WRAPPER FOR AN EXISTING THIRD-PARTY TEXT-BASED CHATBOT THAT IS MANAGAED BY A THIRD-PARTY ENTITY, THE THIRD-PARTY ENTITY BEING DISTINCT FROM THE FIRST-PARTY ENTITY, AND THE VOICE WRAPPER INCLUDING A PLURALITY OF COMPONENTS 552

RECEIVE, AS PART OF A CORRESPONDING CONVERSATION WITH A HUMAN USER VIA A CLIENT DEVICE OF THE HUMAN USER, AUDIO DATA THAT CAPTURES A SPOKEN UTTERANCE OF THE HUMAN USER 554

PROCESS, USING AN ASR COMPONENT, OF THE COMPONENTS OF THE VOICE WRAPPER, THE AUDIO DATA THAT CAPTURES THE SPOKEN UTTERANCE TO GENERATE ASR OUTPUT 556

PROCESS, USING THE EXISTING THIRD-PARTY TEXT-BASED CHATBOT, AT LEAST THE ASR OUTPUT TO GENERATE AN EXISTING THIRD-PARTY TEXT-BASED CHATBOT RESPONSE THAT IS RESPONSIVE TO THE SPOKEN UTTERANCE 558

GIVEN PERSONA OR GIVEN VOICE? 560

GIVEN PERSONA

GIVEN VOICE

PROCESS, USING A PERSONALITY COMPONENT, OF THE COMPONENTS OF THE VOICE WRAPPER, THE EXISTING THIRD-PARTY TEXT-BASED CHATBOT RESPONSE TO GENERATE A VOICE WRAPPER RESPONSE THAT IS BASED ON THE EXISTING THIRD-PARTY TEXT-BASED CHATBOT RESPONSE, BUT DIFFERS FROM THE EXISTING THIRD-PARTY TEXT-BASED CHATBOT RESPONSE 562

SELECT, USING A PERSONALITY COMPONENT, OF THE COMPONENTS OF THE VOICE WRAPPER, A CORRESPONDING SET OF PROSODIC PROPERTIES FOR THE GIVEN VOICE 568

PROCESS, USING A TTS COMPONENT, OF THE COMPONENTS OF THE VOICE WRAPPER, AT LEAST THE VOICE WRAPPER RESPONSE TO GENERATE AN AUDIBLE RESPONSE 564

PROCESS, USING A TTS COMPONENT, OF THE COMPONENTS OF THE VOICE WRAPPER, THE EXISTING THIRD-PARTY TEXT-BASED CHATBOT RESPONSE AND THE CORRESPONDING SET OF PROSODIC PROPERTIES TO GENERATE AN AUDIBLE RESPONSE 570

CAUSE THE AUDIBLE RESPONSE TO BE AUDIBLY RENDERED FOR PRESENTATION TO THE HUMAN USER VIA SPEAKER(S) OF THE CLIENT DEVICE 566

CAUSE THE AUDIBLE RESPONSE TO BE AUDIBLY RENDERED FOR PRESENTATION TO THE HUMAN USER VIA SPEAKER(S) OF THE CLIENT DEVICE 572

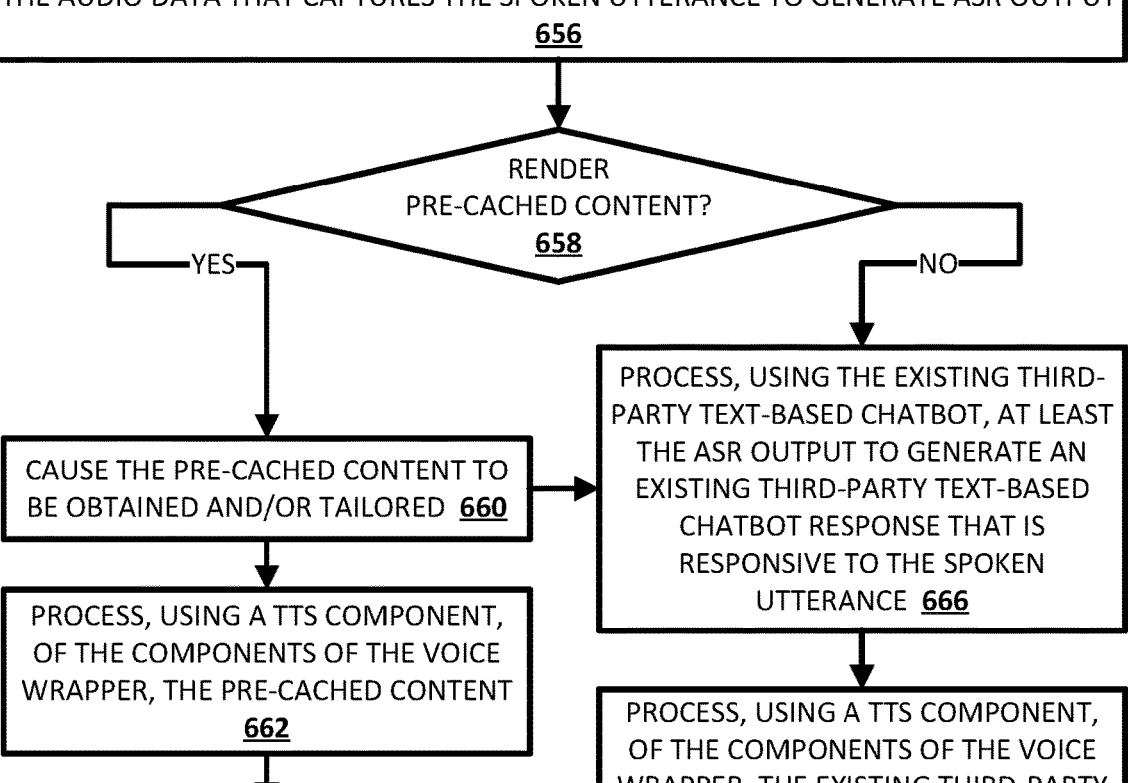

RECEIVE, FROM A FIRST-PARTY ENTITY, A VOICE WRAPPER FOR AN EXISTING THIRD-PARTY TEXT-BASED CHATBOT THAT IS MANAGAED BY A THIRD-PARTY ENTITY, THE THIRD-PARTY ENTITY BEING DISTINCT FROM THE FIRST-PARTY ENTITY, AND THE VOICE WRAPPER INCLUDING A PLURALITY OF COMPONENTS 652

RECEIVE, AS PART OF A CORRESPONDING CONVERSATION WITH A HUMAN USER VIA A CLIENT DEVICE OF THE HUMAN USER, AUDIO DATA THAT CAPTURES A SPOKEN UTTERANCE OF THE HUMAN USER 654

PROCESS, USING AN ASR COMPONENT, OF THE COMPONENTS OF THE VOICE WRAPPER, THE AUDIO DATA THAT CAPTURES THE SPOKEN UTTERANCE TO GENERATE ASR OUTPUT 656

RENDER PRE-CACHED CONTENT? 658

YES

NO

CAUSE THE PRE-CACHED CONTENT TO BE OBTAINED AND/OR TAILORED 660

PROCESS, USING THE EXISTING THIRD-PARTY TEXT-BASED CHATBOT, AT LEAST THE ASR OUTPUT TO GENERATE AN EXISTING THIRD-PARTY TEXT-BASED CHATBOT RESPONSE THAT IS RESPONSIVE TO THE SPOKEN UTTERANCE 666

PROCESS, USING A TTS COMPONENT, OF THE COMPONENTS OF THE VOICE WRAPPER, THE PRE-CACHED CONTENT 662

PROCESS, USING A TTS COMPONENT, OF THE COMPONENTS OF THE VOICE WRAPPER, THE EXISTING THIRD-PARTY TEXT-BASED CHATBOT RESPONSE 668

CAUSE THE PRE-CACHED CONTENT TO BE AUDIBLY RENDERED FOR PRESENTATION TO THE HUMAN USER VIA SPEAKER(S) OF THE CLIENT DEVICE 664

CAUSE THE EXISTING THIRD-PARTY TEXT-BASED CHATBOT RESPONSE TO BE AUDIBLY RENDERED FOR PRESENTATION TO THE HUMAN USER VIA SPEAKER(S) OF THE CLIENT DEVICE 670

FIG. 6

VOICE WRAPPER(S) FOR EXISTING THIRD-PARTY TEXT-BASED CHATBOT(S)

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a textual input that is received from a client device, and generate a response that is responsive to the textual input and that is to be rendered at the client device. In many instances, these LLMs can cause textual output to be included in the response. Accordingly, when these LLMs engage in human-to-computer dialogs, they can be referred to as "chatbots," "automated assistants", "intelligent personal assistants," etc. (referred to herein as "chatbots").

However, these chatbots are often limited to engaging in text-based conversations in that a user may only provide textual input and the response only includes textual output. Since these LLMs leveraged by these chatbots are typically trained on enormous amounts of diverse data, re-training these LLMs to enable them to engage in voice-based conversations can consume vast amounts of computational resources. Furthermore, the underlying architecture of these LLMs leveraged by these chatbots, and the underlying training data utilized to train these LLMs leveraged by these chatbots, may not be readily adaptable for re-training these LLMs to enable them to engage in voice-based conversations. Accordingly, there is a need in the art to efficiently enable these text-based chatbots to engage in corresponding voice-based conversations with users.

SUMMARY

Implementations are directed to providing a voice wrapper to an existing third-party text-based chatbot to enable the existing third-party text-based chatbot to engage in corresponding voice-based conversations. The voice wrapper can include a plurality of components. For instance, the voice wrapper can include a plurality of input components for utilization in responding to a spoken utterance, and in lieu of the existing third-party text-based chatbot, and/or to modify input to be provided to the existing third-party text-based chatbot in responding to the spoken utterance. Also, for instance, the voice wrapper can include a plurality of output components for utilization in responding to the spoken utterance, to reduce perceived latency of the existing third-party text-based chatbot, and/or to modify output generated by the existing third-party text-based chatbot in responding to the spoken utterance. Notably, the existing third-party text-based chatbot may leverage large language model(s) (LLM(s)). Accordingly, by selectively utilizing the voice wrapper in conjunction with the existing third-party text-based chatbot, computational resources may be conserved since processing using the plurality of components of the voice wrapper consumes fewer computational resources than processing using the existing third-party text-based chatbot.

In various implementations, the plurality of input components can include: an input detection component to determine that the spoken utterance is directed to the existing third-party text-based chatbot, an automatic speech recognition (ASR) component to process the audio data that captures the spoken utterance to generate ASR output for the spoken utterance; a natural language understanding (NLU) component to process the ASR output to generate NLU output for the spoken utterance; a fulfillment component to process the ASR output for the spoken utterance and/or the NLU output for the spoken utterance to generate fulfillment output for the spoken utterance; a large language model (LLM) component to process the ASR output to generate LLM output for the spoken utterance; an endpointing component to process the audio data that captures the spoken utterance and/or other signals to determine whether to initiate processing of the audio data that captures the spoken utterance; a modification component to process the ASR output for the spoken utterance and/or the NLU output for the spoken utterance to generate voice wrapper output; an interruption component to process the ASR output for the spoken utterance and/or the NLU output for the spoken utterance to determine whether the spoken utterance is an interruption and/or a type of the interruption; a disambiguation component to process the ASR output for the spoken utterance and/or the NLU output for the spoken utterance to determine whether to disambiguate the spoken utterance; and/or other input components that may be utilized to process the spoken utterance. Accordingly, the plurality of input components supplement functionality of the existing third-party text-based chatbot beyond performing ASR on behalf of the existing third-party text-based chatbot.

As one non-limiting example, the voice wrapper can determine when the spoken utterance is directed to the existing third-party text-based chatbot. For example, assume that the spoken utterance includes a particular word or phrase (e.g., "Chatbot", "Hey, Chatbot", or the like) that, when detected, activates one or more of the components of the voice wrapper. In this example, the voice wrapper can determine that the spoken utterance is directed to the existing third-party text-based chatbot based on the presence of the particular word or phrase in the spoken utterance. Also, for example, assume that the spoken utterance is received while the user is looking at the client device at which the existing third-party text-based chatbot is accessible. In this example, the voice wrapper can determine that the spoken utterance is directed to the existing third-party text-based chatbot based on the presence of the user's gaze being directed at the client device combined with the user providing the spoken utterance. Also, for example, assume that the spoken utterance is received subsequent to actuation of a hardware or software button, or subsequent to some other user interaction with the client device (e.g., shaking of the client device, squeezing of the client device, etc.), that indicates the user would like to interact with the existing third-party text-based chatbot. In this example, the voice wrapper can determine that the spoken utterance is directed to the existing third-party text-based chatbot based on one or more of these user interactions with the client device immediately prior to the spoken utterance being received. Accordingly, the voice wrapper can determine when the spoken utterance is directed to the existing third-party text-based chatbot and on behalf of the existing third-party text-based chatbot. This effectively enables the existing third-party text-based chatbot to distinguish from situations where spoken utterances are detected in noisy environments compared to situations where spoken utterances are actually directed to the existing third-party text-based chatbot.

As another non-limiting example, the voice wrapper can determine when the user is done providing the spoken utterance. For example, the voice wrapper can use a hard endpointing technique to determine when the user is actually done providing the spoken utterance. In these examples the voice wrapper can determine that the user is actually done providing the spoken utterance based on detecting silence, a long pause, or other acoustic signals like intonation or inflection of the user in providing the spoken utterance. Also, for example, the voice wrapper can use a soft endpointing technique to determine that the user has provided enough information in the spoken utterance to initiate further processing of the audio data that captures the spoken utterance, even if the user is not actually done providing the spoken utterance. In these examples, the voice wrapper can determine that the user has provided enough information based on, for instance, determining enough information is known to generate a response to the spoken utterance (e.g., based on ASR output for the spoken utterance generated using the ASR component, NLU output for the spoken utterance generated using the NLU component, fulfillment output for the spoken utterance generated using the fulfillment component, and/or LLM output for the spoken utterance generated using the LLM component). Moreover, and even before the user is done providing the spoken utterance, the voice wrapper can cause the existing third-party text-based chatbot to initiate processing of the ASR output (or a portion of the ASR output that is available) to reduce latency in causing a response to the spoken utterance to be rendered.

As yet another non-limiting example, the voice wrapper can handle interruptions on behalf of the existing third-party text-based chatbot. For example, assume that the spoken utterance is received while a current response is being rendered for presentation to a user that provided the spoken utterance. In this example, the spoken utterance can be considered an interruption. Further, and depending on the type of the interruption, the voice wrapper can determine to handle all of the processing of the spoken utterance to generate a response to the spoken utterance or determine to ignore the spoken utterance. For instance, if the spoken utterance is a non-critical interruption that requests the existing third-party text-based chatbot repeat the current response that is being rendered, then the voice wrapper can utilize the ASR component, the NLU component, and the fulfillment component to determine that the user wants the current response to be repeated, and can cause the current response to be repeated without having to prompt the existing third-party text-based chatbot. Also, for instance, if the spoken utterance is a non-critical interruption that includes filler speech or words of affirmation, then the voice wrapper can utilize the ASR component and/or the NLU component to determine to ignore the spoken utterance. Notably, in these examples, the spoken utterance does not substantively alter a course of the corresponding conversation. However, if the spoken utterance is a critical interruption that does substantively alter the course of the corresponding conversation (e.g., includes an unrelated prompt or an unrelated query), then the voice wrapper can utilize the ASR component to generate ASR output, and provide the ASR output (or voice wrapper output that is based on the ASR output, but differs from the ASR output), then the voice wrapper can prompt the existing third-party text-based chatbot.

As yet another non-limiting example, the voice wrapper can handle disambiguating spoken utterance on behalf of the existing third-party text-based chatbot. For example, assume that the voice wrapper utilizes the ASR component, the NLU component, and/or the LLM component to process the spoken utterance, but determines that there is a need to disambiguate the spoken utterance. For instance, the disambiguation component can attempt to disambiguate the spoken utterance and without prompting the user (e.g., based on context data, such as user profile data, user preference data, location data, etc.). In some of these instances, and assuming that the disambiguation component can disambiguate the spoken utterance without prompting the user, the voice wrapper can utilize the modification component to modify the ASR output before providing it to the existing third-party text-based chatbot, and provide voice wrapper output (e.g., that is based on the ASR output, but differs from the ASR output) to the existing third-party text-based chatbot to generate a response to the spoken utterance. In other instances, and assuming that the disambiguation component can disambiguate the spoken utterance without prompting the user, the voice wrapper can handle prompting the user to disambiguate the spoken utterance and on behalf of the existing third-party text-based chatbot. Notably, the voice wrapper can cause the modification component to modify the ASR output even in instances where disambiguation is not needed (e.g., the remove filler speech, stop words, etc.), thereby reducing the length of an input processed by the existing third-party text-based chatbot and conserving computational resources.

In various implementations, the plurality of output components can include: a text-to-speech (TTS) component to generate synthesized speech audio data that captures synthesized speech corresponding to an audible response for an existing third-party text-based chatbot response; a personality component to cause the audible response to reflect a particular persona, from among a plurality of disparate personas, or a particular voice, from among a plurality of disparate voices; a latency component to determine whether to cause pre-cached content to be audibly rendered while the existing third-party text-based chatbot response is being generated; and/or other output components that may be utilized in generating a response to the spoken utterance. Accordingly, the plurality of output components supplement functionality of the existing third-party text-based chatbot beyond performing TTS on behalf of the existing third-party text-based chatbot.

As one non-limiting example, the voice wrapper can cause a response generated by the existing third-party text-based chatbot to reflect a given persona, from among a plurality of disparate personas, and/or a given voice, from among a plurality of disparate voices. For example, the user that provided the spoken utterance can specify the given persona and/or the given voice prior to engaging in the corresponding conversation with the existing third-party text-based chatbot. The given persona can be embodied by, for example, a given vocabulary that is specific to the given persona and that is utilized in modifying the response generated by the existing third-party text-based chatbot, a given speaking style (e.g., terse, verbose, etc.), and/or other characteristics that may be reflected by the given persona. For instance, the personality component can process the response generated by the existing third-party text-based chatbot, and along with given persona data that is specific to the given persona, to reflect the given persona. Notably, and in contrast with text-based conversations, voice-based conversations are often more succinct and terser than text-based conversations since a user cannot re-read prior turns of the corresponding conversation. Accordingly, by using a given persona that reflects a terser style, the voice wrapper can process a response generated by the existing third-party text-based conversation to ensure that it is less verbose and more suitable for voice-based conversations. The given voice can be embodied by, for example, a corresponding set of prosodic properties that is utilized in synthesizing audio data, that captures synthesized speech corresponding to the response generated by the existing third-party text-based chatbot, to reflect the given voice. For instance, the personality component can select the corresponding set of prosodic properties that is specific to the given voice, and cause the TTS engine to synthesize the response generated by the existing third-party text-based chatbot using the corresponding set of prosodic properties.

As another non-limiting example, the voice wrapper can cause pre-cached content to be rendered prior to the response generated by the existing third-party text-based chatbot. For example, the latency component can determine a predicted latency in causing the existing third-party text-based chatbot to generate the response. Further, the latency component can determine to cause the pre-cached content to be rendered if the predicted latency satisfies a latency threshold. Some instances of when the predicted latency satisfies the latency threshold can include, for instance, scenarios when the existing third-party text-based chatbot has to interact with one or more external systems, the spoken utterance is relatively complex, the spoken utterances includes a request for information that is not readily available (e.g., the information is based on an occurrence of a future event), and/or in other scenarios. Accordingly, the pre-cached content can be obtained (and optionally tailored to the spoken utterance), and rendered while the existing third-party text-based chatbot is generating the response. Notably, the pre-cached content and the response that is generated by the existing third-party text-based chatbot may be audibly perceived as a single response.

By utilizing techniques described herein, one or more technical advantages may be achieved. For example, by utilizing the plurality of input components, the voice wrapper not only determines whether to prompt the existing third-party text-based chatbot, but also what to provide to the existing third-party text-based chatbot. In implementations where the voice wrapper handles the spoken utterance on behalf of the existing third-party text-based chatbot, computational resources can be conserved since the plurality of input components of the voice wrapper consume fewer computational resources than the existing third-party text-based chatbot. Further, in implementations where the voice wrapper modifies what is provided to the existing third-party text-based chatbot, occurrences of the existing third-party text-based chatbot having to prompt the user for clarification can be eliminated and/or mitigated, and/or a length of the input processed by the existing third-party text-based chatbot can be reduced, thereby conserving computational resources. Moreover, in various implementations, by causing the existing third-party text-based chatbot to initiate processing of the audio data that captures the spoken utterance before the user is done providing the spoken utterance, latency in causing a response to the spoken utterance to be rendered can be reduced. As another example, by utilizing the plurality of output components, the voice wrapper can reduce latency in content being rendered at the client device through utilization of the pre-cached content. Notably, in all of these examples, the existing third-party text-based chatbot need not be re-trained or fine-tuned.

The above description is provided as an overview of only some implementations disclosed herein. Those implementations, and other implementations, are described in additional detail herein.

BRIEF DESCRIPTION OF THE DRAWINGS

FIG. 3 depicts a flowchart illustrating an example method of determining whether to utilize a voice wrapper or an existing third-party text-based chatbot in responding to a spoken utterance, in accordance with various implementations.

FIG. 4 depicts a flowchart illustrating an example method of utilizing a voice wrapper to modify input provided to an existing third-party text-based chatbot in responding to a spoken utterance, in accordance with various implementations.

FIG. 5 depicts a flowchart illustrating an example method of utilizing a voice wrapper to cause an existing third-party text-based chatbot to exhibit a given persona or a given voice, in accordance with various implementations.

FIG. 6 depicts a flowchart illustrating an example method of determining whether to utilize a voice wrapper to cause pre-cached content to be audibly rendered while an existing third-party text-based chatbot is generating a response, in accordance with various implementations.

DETAILED DESCRIPTION

Figure 1:
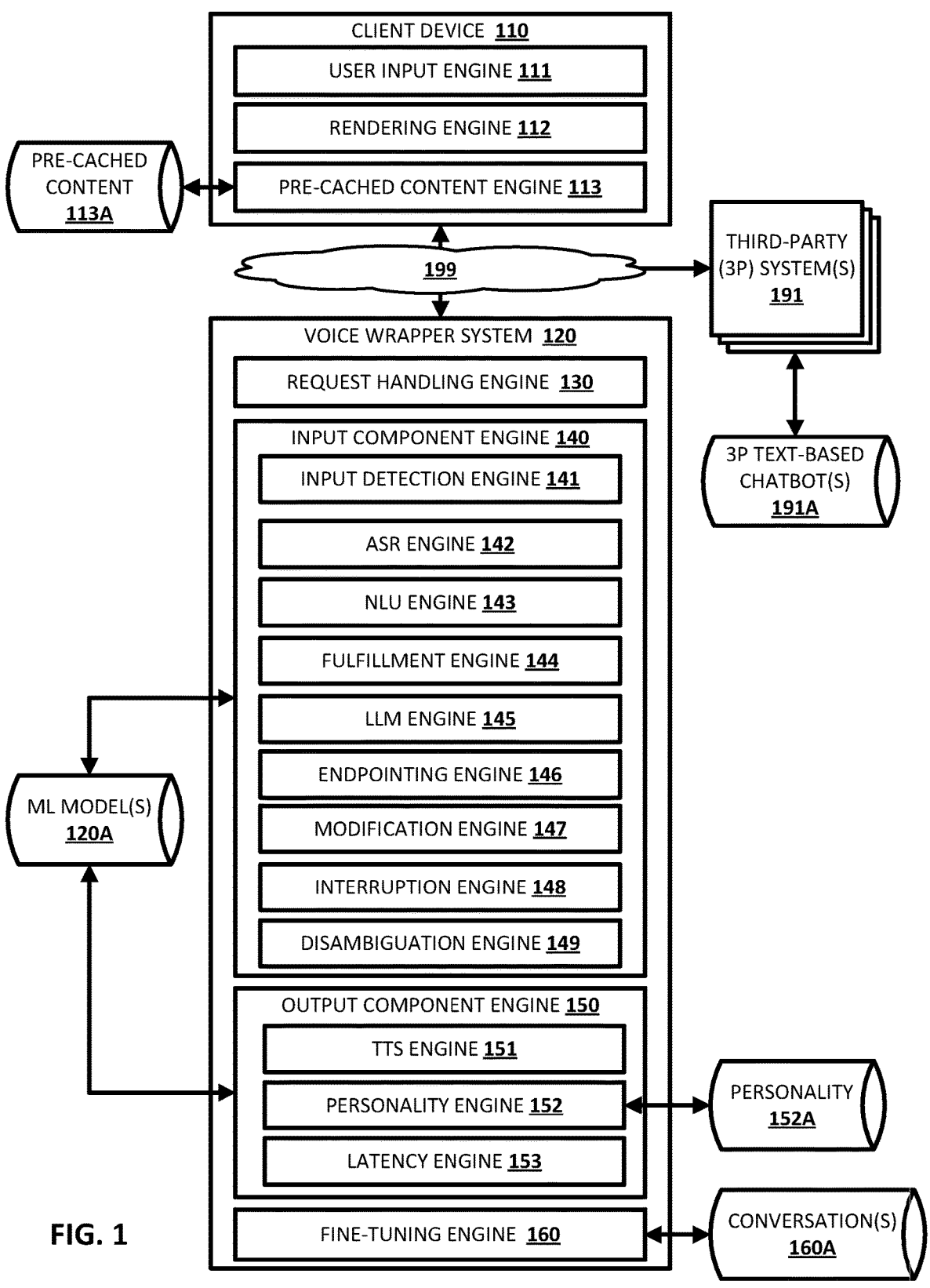
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, a user input engine 111, a rendering engine 112, and a pre-cached content engine 113. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of being utilized to engage in a corresponding conversation with a voice-based chatbot.

The user input engine 111 can detect various types of user input at the client device 110. In some examples, the user input detected at the client device 110 can include spoken utterance(s) of a human user of the client device 110 that is detected via microphone(s) of the client device 110. In these examples, the microphone(s) of the client device 110 can generate audio data that captures the spoken utterance(s). In other examples, the user input detected at the client device 110 can include touch input of a human user of the client device 110 that is detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 112 can cause responsive content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The responsive content and/or other output can include, for example, dialog content corresponding to a voice wrapper response as described herein (e.g., with respect to FIGS. 2, 3, and 6), an existing third-party text-based chatbot response as described herein (e.g., with respect to FIGS. 2, 3, 4, 5, and 6), and/or other dialog content.

Further, the client device 110 is illustrated in FIG. 1 as communicatively coupled, over one or more of the networks 199, to a voice wrapper system 120. In some implementations, and as depicted in FIG. 1, the voice wrapper system 120 can be a high-performance server, a cluster of high-performance servers, and/or any other computing device that is remote from the client device 110. However, in other implementations, the voice wrapper system 120 can be implemented locally at the client device 110. The voice wrapper system 120 includes, in various implementations, a request handling engine 130, an input component engine 140, an output component engine 150, and a fine-tuning engine 160. As described herein, a voice wrapper can include a plurality of components. The plurality of components can include a plurality of input components (e.g., implemented by the input component engine 140) and a plurality of output components (e.g., implemented by the output component engine 150). The input component engine 140 and the output component engine 150 can include various sub-engines.

For instance, the input component engine 140 can include an input detection engine 141, an automatic speech recognition (ASR) engine 142, a natural language understanding (NLU) engine 143, a fulfillment engine 144, a large language model (LLM) engine 145, an endpointing engine 146, a modification engine 147, an interruption engine 148, and disambiguation engine 149. Also, for instance, the output component engine 150 can include a text-to-speech (TTS) engine 151, a personality engine 152, and a latency engine 153. Although the input component engine 140 and the output component engine 150 are depicted as including particular sub-engines, it should be understood that is for the sake of example and is not meant to be limiting. Rather, it should be understood that one or more of these sub-engines can be combined and/or omitted. For instance, in some implementations, the LLM engine 145 may be omitted in view of the NLU engine 143 and the fulfillment engine 144, whereas in other implementations, the NLU engine 143 and the fulfillment engine 144 may be omitted in view of the LLM engine 145.

Moreover, the client device 110 is also illustrated in FIG. 1 as communicatively coupled, over one or more networks 199 (e.g., any combination of Wi-Fi, Bluetooth, or other local area networks (LANs); ethernet, the Internet, or other wide area networks (WANs); and/or other networks), to various third-party ("3P") systems 191 that have access to respective 3P text-based chatbots (e.g., via database 191A). As used herein, the term "first-party" or "first-party entity" refers to an entity that develops and/or maintains a voice wrapper system 120, whereas the term "third-party" or "third-party entity" refers to an entity that is distinct from the entity that develops and/or maintains the voice wrapper system 120. Accordingly, any text-based chatbots that are developed and/or maintained by the entity that develops and/or maintains the voice wrapper system 120 may be referred to as "first-party text-based chatbots". Similarly, any text-based chatbots that are developed and/or maintained by any entity other than the entity that develops and/or maintains the voice wrapper system 120 may be referred to as "third-party text-based chatbots".

Although techniques are described here with respect to providing the voice wrapper(s) to existing third-party text-based chatbot(s), it should be understood that is for the sake of example and is not meant to be limiting. Rather, it should be understood that the voice wrapper(s) described herein may also be provided to existing first-party text-based chatbot(s). In these implementations, the existing first-party voice-based chatbot(s) may be developed and/or maintained by the same first-party entity that develops and/or maintains the voice wrapper system 120 and the corresponding component(s) of the voice wrapper(s) described herein. Nonetheless, the voice wrapper(s) may extend the functionality of the existing first-party text-based chatbot(s) in the same or similar manner described herein with respect to the existing third-party text-based chatbot(s).

Furthermore, the client device 110 and the voice wrapper system 120 can include one or more memories for storage of data and/or software applications (e.g., software application(s) to interact with the 3P system(s) 191), one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

As described herein, the voice wrapper system 120 can be utilized to enable an existing third-party text-based chatbot (e.g., stored in the 3P text-based chatbot(s) database 191A) to engage in corresponding voice-based conversations with a user of the client device 110. In doing so, the voice wrapper does not only provide ASR and TTS capabilities to the existing third-party text-based chatbot, but the voice wrapper also provides additional functionality that results in conservation of computational resources in a human-to-computer dialog between the user and the existing third-party text-based chatbot. Notably, the existing third-party text-based chatbot, in processing various text-based inputs that are received (e.g., detected via the user input engine 111), may leverage various LLM(s) that are computationally intensive. In contrast, the voice wrapper may include less computationally intensive LLM(s) (e.g., that have fewer parameters, fewer weights, etc.) or omit LLM(s) altogether. In these and other manners, the additional functionality provided by the voice wrapper can handle various user inputs, which results in the conservation of the computational resources as noted above since fewer inference calls to the these LLM(s) are required.

As some non-limiting examples, the voice wrapper can determine when spoken utterances are directed to the existing third-party text-based chatbot, determine when to initiate processing of spoken utterances that are directed to the existing third-party text-based chatbot, handle interruptions on behalf of the existing third-party text-based chatbot, disambiguate spoken utterance on behalf of the existing third-party text-based chatbot, remove filler speech from spoken utterances on behalf of the existing third-party text-based chatbot, supplement spoken utterances on behalf of the existing third-party text-based chatbot, reduce latency of the existing third-party text-based chatbot, enhance a personality of the existing third-party text-based chatbot, and/or provide other functionalities. Nonetheless, from the perspective of the user of the client device 110 that is engaged in the corresponding conversation with the existing third-party text-based chatbot, it may appear that the existing third-party text-based chatbot that is performing this functionality. Accordingly, the voice wrapper can include functionality to supplement existing functionality of the existing third-party text-based chatbot without having to fully re-train the existing third-party text-based chatbot, modify an architecture of the existing third-party text-based chatbot, and so on, thereby conserving computational resources.

The corresponding conversations that are described herein can be conducted by the text-based chatbots in various manners. For example, the corresponding conversations can include corresponding conversations conducted during telephone calls (e.g., Voice over Internet Protocol (VoIP), public switched telephone networks (PSTN), and/or other telephonic communication protocols) and between the user the client device 110 and the existing third-party text-based chatbot, corresponding conversations conducted locally at the client device 110 between the user of the client device 110 and the existing third-party text-based chatbot, and/or in any other voice-based conversation.

In various implementations, the request handling engine 130 can determine a need for the voice wrapper to supplement existing functionality of the existing third-party text-based chatbot. In some implementations, the request handling engine 130 can receive an explicit request for the voice wrapper from the third-party entity that manages the existing third-party voice-based chatbot. In other implementations, the request handling engine 130 can proactively determine a need for the voice wrapper on behalf of the third-party entity that manages the existing third-party voice-based chatbot (e.g., based on the existing third-party text-based chatbot being newly developed, etc.).

In various implementations, the input detection engine 141 can determine whether the spoken utterance is directed to the existing third-party text-based chatbot. In response to input detection engine 141 determining that the spoken utterance is directed to the existing third-party text-based chatbot, the input detection engine 141 can activate one or more additional components of the voice wrapper and/or components of the existing third-party text-based chatbot. For example, the user input engine 111 of the client device 110 may determine that a spoken utterance is detected at the client device 110 as described above. However, the input detection engine 141 can verify that the spoken utterance is, in fact, directed to the existing third-party text-based chatbot.

In some versions of those implementations, the input detection engine 141 can process, using a hotword detection model stored in the ML model(s) database 120A, the audio data that captures the spoken utterance to determine whether the spoken utterance includes a particular word or phrase to invoke the existing third-party text-based chatbot (e.g., "Chatbot", "Hey Chatbot", or the like). In these implementations, the presence of the particular word or phrase in the spoken utterance can be a sufficient signal to infer that the user is directing the spoken utterance to the existing third-party text-based chatbot. In additional or alternative versions of those implementations, the input detection engine 141 can process, using a hotword free invocation model stored in the ML model(s) database 120A, vision data that captures the user providing the spoken utterance to determine whether the user has provided a particular gesture to invoke the existing third-party text-based chatbot (e.g., a particular hand movement, head movement, arm movement, or the like). In these implementations, the user's gesture being directed to the client device 110, and optionally coupled with detecting the spoken utterance, can be a sufficient signal to infer that the user is directing the spoken utterance to the existing third-party text-based chatbot. In additional or alternative versions of those implementations, the input detection engine 141 can process, using a gaze detection model stored in the ML model(s) database 120A, vision data that captures the user providing the spoken utterance to determine whether the user is looking at the client device when the spoken utterance is provided. In these implementations, the user's gaze being directed to the client device 110 coupled with detecting the spoken utterance can be a sufficient signal to infer that the user is directing the spoken utterance to the existing third-party text-based chatbot, and even without an explicit signal from the user (e.g., without the particular word or phrase being spoken, without the particular gesture being made, etc.).

In various implementations, the ASR engine 142 can process, using ASR model(s) stored in the ML model(s) database 120A (e.g., a recurrent neural network (RNN) model, a transformer model, and/or any other type of ML model capable of performing ASR), audio data that captures a spoken utterance and that is generated by microphone(s) of the client device 110 to generate ASR output. Further, the NLU engine 143 can process, using NLU model(s) stored in the ML model(s) database 120A (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 111 of the client device 110) to generate NLU output. Moreover, the fulfillment engine 144 can process, using fulfillment model(s) and/or fulfillment rules stored in the ML model(s) database 120A, the NLU data to generate fulfillment output. In addition to, or in lieu of, the NLU engine 143 and/or the fulfillment engine 144, the LLM engine 145 can process, using LLM(s) stored in the ML model(s) database 120A (e.g., PaLM, BARD, BERT, LaMDA, Meena, GPT, and/or any other LLM, such as any other LLM that is encoder-only based, decoder-only based, sequence-to-sequence based and that optionally includes an attention mechanism or other memory), the ASR output (or other typed or touch inputs received via the user input engine 120 of the client device 110) to generate LLM output.

In various implementations, the ASR output can include, for example, a plurality of speech hypotheses (e.g., term hypotheses and/or transcription hypotheses) that are predicted to correspond to spoken utterance(s) based on the processing of audio data that captures the spoken utterance(s). The ASR engine 142 can optionally select a particular speech hypotheses as recognized text for the spoken utterance(s) based on a corresponding value associated with each of the plurality of speech hypotheses (e.g., probability values, log likelihood values, and/or other values). In various implementations, the ASR model(s) stored in the ML model(s) database 120A are end-to-end speech recognition model(s), such that the ASR engine 142 can generate the plurality of speech hypotheses directly using the ASR model(s). For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms or other memory. In other implementations, the ASR model(s) are not end-to-end speech recognition model(s) such that the ASR engine 142 can instead generate predicted phoneme(s) (and/or other representations). For instance, the predicted phoneme(s) (and/or other representations) may then be utilized by the ASR engine 142 to determine a plurality of speech hypotheses that conform to the predicted phoneme(s). In doing so, the ASR engine 142 can optionally employ a decoding graph, a lexicon, and/or other resource(s). In various implementations, a corresponding transcription that includes the recognized text can be rendered at the client device 110.

In various implementations, the NLU output can include, for example, annotated recognized text that includes one or more annotations of the recognized text for one or more (e.g., all) of the terms of the recognized text. For example, the NLU engine 143 may include a part of speech tagger (not depicted) configured to annotate terms with their grammatical roles. Additionally, or alternatively, the NLU engine 143 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 143 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 143 may rely on annotations from one or more other components of the NLU engine 143. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution. The user data may include, for example, historical location data, historical temporal data, user preference data, user account data, calendar information, email data, and/or any other user data that is accessible at the client device 110.

In various implementations, the fulfillment output can include, for example, one or more tasks to be performed by the existing third-party text-based chatbot and/the voice wrapper. For example, the user can provide unstructured free-form natural language input in the form of spoken utterance(s). The spoken utterance(s) can include, for instance, an indication of the one or more tasks to be performed by the existing third-party text-based chatbot. The one or more tasks may require the existing third-party text-based chatbot and/or the voice wrapper to provide certain information to the user, engage with one or more external systems on behalf of the user (e.g., an inventory system, a reservation system, etc. via a remote procedure call (RPC)), and/or any other task that may be specified by the user and performed by the existing third-party text-based chatbot and/or the voice wrapper. Accordingly, it should be understood that the fulfillment output may be based on the one or more tasks to be performed by the existing third-party text-based chatbot and/or the voice wrapper and may be dependent on the corresponding conversations with the user.

In various implementations, the LLM output can include, for example, a probability distribution over a sequence of tokens, such as words, phrases, or other semantic units, that are predicted to be responsive to the spoken utterance(s) provided by the user of the client device 110. Notably, the LLM(s) stored in the ML model(s) database 120A can include millions, or even billions, of weights and/or parameters that are learned through training the LLM on enormous amounts of diverse data. This enables these LLM(s) to generate the LLM output as the probability distribution over the sequence of tokens. In these implementations, the LLM engine 145 can replace the NLU engine 143 and/or the fulfillment engine 144 since these LLM(s) can perform the same or similar functionality in terms of natural language processing. However, and as noted above, the LLM(s) utilized by the LLM engine 145 may include less computationally intensive LLM(s) (e.g., that have fewer parameters, fewer weights, etc.) compared to LLM(s) utilized by the existing third-party text-based chatbot. Further, the LLM(s) utilized by the LLM engine 145 may be specifically trained on a corpus of data that includes diverse conversations to enable these LLM(s) to learn how humans naturally converse in a more generalized manner, and can optionally be fine-tuned based on specific domain-relevant corpora of data (e.g., a small business domain-relevant corpora of data, a large business domain-relevant corpora of data, an individual domain-relevant corpora of data, and/or other domain-relevant corpora of data).

In various implementations, the endpointing engine 146 can determine when the human user is done providing the spoken utterance. For example, the endpointing engine 146 can process, using an endpoint detection model stored in the ML model(s) database 120A, the audio data that captures the spoken utterance to determine whether the user is actually done providing the spoken utterance. In some versions of those implementations, the endpoint detection model can monitor for windows of silence, pauses of various durations and/or other acoustic signals that indicates the user is done speaking, such as an intonation or inflection on a last word in a sentence to determine that the user is done providing the spoken utterance. In these implementations, the endpoint detection model is utilizing a so-called "hard" endpointing technique in that it detects when the user is, in fact, actually done providing the spoken utterance. In additional or alternative versions of those implementations, the endpoint detection model can determine that the user has provided enough information in the spoken utterance to initiate further processing of the audio data that captures the spoken utterance, even if the user is not actually done providing the spoken utterance. In these implementations, the endpoint detection model is utilizing a so-called "soft" endpointing technique in that it detects when the user had provided enough information to generate a response to the spoken utterance (e.g., based on the ASR output for the spoken utterance generated using the ASR engine 142, the NLU output for the spoken utterance generated using the NLU engine 143, the fulfillment output for the spoken utterance generated using the fulfillment engine 144, and/or the LLM output for the spoken utterance generated using the LLM engine 145).

Notably, and even before the endpointing engine 146 determines that user is done providing the spoken utterance using a hard endpointing technique or a soft endpointing technique, the voice wrapper can initiate processing of the ASR output (or a portion of the ASR output that is available) or can cause the existing third-party text-based chatbot to initiate processing of the ASR output (or a portion of the ASR output that is available). This enables latency to be reduced in causing a response to the spoken utterance to be rendered. In implementations where the voice wrapper subsequently determines that only the voice wrapper should be utilized in responding to the spoken utterance (e.g., using the modification engine 147, the interruption engine 148, the disambiguation engine 149, etc.), the voice wrapper can cause the existing third-party text-based chatbot to refrain from further processing of the audio data that captures the spoken utterance. Conversely, in implementations where the voice wrapper subsequently determines that only the existing third-party text-based chatbot should be utilized in responding to the spoken utterance, the voice wrapper can cause the input component engine 140 to refrain from further processing of the audio data that captures the spoken utterance.

In various implementations, the modification engine 147 can process the ASR output and/or the NLU output to generate voice wrapper output that is based on the ASR output and/or the NLU output, but that differs from the ASR output and/or the NLU output. In some implementations, the modification component can determine that the ASR output includes filler speech and/or stop words (e.g., based on the ASR output itself and/or based on the NLU output that is generated based on the ASR output). Further, and in response to determining that the ASR output includes filler speech and/or stop words, the voice wrapper can determine to cause the modification component to process the ASR output to remove the filler speech and/or stop words. The filler speech can include, for example, "umm", "hmm", "hmm", "kind of", "you see", "well", "literally", "basically", "at the end of the day", and/or other insignificant speech that does not substantively contribute to a meaning or intent of the user in providing the spoken utterance. Further, the stop words can include, for example, "the", "is", "at", "which", "on", and/or other insignificant speech that also does not substantively contribute to a meaning or intent of the user in providing the spoken utterance. By using the voice wrapper to remove this filler speech and/or these stop words, the voice wrapper output includes fewer words or tokens than the ASR output, thereby subsequently reducing a length of an input processed by the existing third-party text-based chatbot and conserving computational resources. However, and in response to determining that the ASR output does not include any filler speech and/or stop words, the voice wrapper can refrain from causing the modification component to process the ASR output to remove the filler speech and/or stop words. Rather, the voice wrapper can pass the ASR output directly to the existing third-party text-based chatbot for subsequent processing.

In additional or alternative implementations, the modification component 145 can determine that the ASR output is unclear (e.g., based on the ASR output itself and/or based on the NLU output that is generated based on the ASR output). In some versions of these implementations, the voice wrapper can disambiguate the spoken utterance and without having to prompt the user of the client device 110, that provided the spoken utterance, for clarification. For example, assume that the spoken utterance corresponds to "what are some things that I can along the way when I'm driving to Bagdad", and that a client device context of the client device 110 indicates that the user is located in Louisville, KY. In this example, the modification component can process the ASR output to modify "Bagdad" in the ASR output to indicate "Bagdad, KY" since the user of client device 110 cannot drive from Louisville, KY to Baghdad, Iraq, but the user can drive from Louisville, KY to Bagdad, KY. By using the voice wrapper to disambiguate the spoken utterance without prompting the user of the client device 110, the voice wrapper output can mitigate instances where the existing third-party text-based chatbot generates output that requests clarification from the user, thereby subsequently reducing a outputs generated by the existing third-party text-based chatbot and conserving computational resources. However, and in response to determining that the spoken utterance does not need to be disambiguated, the voice wrapper can refrain from causing the modification component to process the ASR output to disambiguate the spoken utterance. Rather, the voice wrapper can pass the ASR output directly to the existing third-party text-based chatbot for subsequent processing.

In various implementations, the interruption engine 148 can handle interruptions on behalf of the existing third-party text-based chatbot. In some implementations, the voice wrapper can cause subsequent processing of the spoken utterance to be adapted based on a type of the interruption. In these implementations, the interruption engine 148 can determine the type of interruption based on processing, using an interruption classifier (e.g., stored in the ML model(s) database 120A), the ASR output and/or the NLU output. The type of interruption can be one of a plurality of disparate types of interruptions, and the plurality of disparate types of interruptions can include, for example, at least a non-critical interruption and a critical interruption. The non-critical interruption can include, for example, some filler speech (e.g., "umm", "hmm", "hmm", etc.), words of affirmation (e.g., "yes", "go on", etc.), words or repetition (e.g., "can you repeat that?", "come again?", "what was that?", etc.), and/or other speech that does not substantively alter a course of the voice-based conversation. For instance, assume that the spoken utterance is received while a current response (e.g., generated by the existing third-party text-based chatbot or the voice wrapper) is being audibly rendered for presentation to the user of the client device 110. Further assume that the spoken utterance asks that the current response be repeated from the beginning. In this example, the interruption engine 148 can determine that the spoken utterance is an interruption, and, more specifically, that the interruption is a non-critical interruption. Accordingly, the interruption engine 148 can then cause the fulfillment component 143 to cause the response to be repeated.

Notably, in this example, and assuming the existing third-party text-based chatbot leverages an LLM, there is no guarantee that if the existing third-party text-based chatbot handles the interruption that the response would be the same as the current response since LLMs are probabilistic in nature.

The critical interruption can include, for example, words of cessation (e.g., "stop", etc.), words of unrelated spoken utterances, and/or any speech that substantively alters a course of the voice-based conversation. For instance, again assume that the spoken utterance is received while a current response (e.g., generated by the existing third-party text-based chatbot or the voice wrapper) is being audibly rendered for presentation to the user of the client device 110. Further assume that the spoken utterance asks an entirely unrelated query. In this example, the interruption engine 148 can determine that the spoken utterance is an interruption, and, more specifically, that the interruption is a critical interruption. Accordingly, the interruption engine 148 can then cause the existing third-party text-based chatbot to generate a response to the unrelated query. Notably, whether the interruption is a non-critical or critical interruption, the voice wrapper can cease any audible rendering of the current response that is being rendered when the spoken utterance is received.

In various implementations, the disambiguation engine 149 can determine that the ASR output is unclear (e.g., based on the ASR output itself and/or based on the NLU output that is generated based on the ASR output) similarly to the modification engine 147. However, in contrast with the modification engine 147, the voice wrapper can disambiguate the spoken utterance and with having to prompt the user of the client device 110, that provided the spoken utterance, for clarification. In response to the disambiguation engine 149 determining that there is a need to prompt the user of the client device 110 that there is a need to disambiguate the spoken utterance, the disambiguation engine 149 can cause the fulfillment engine 144 to cause disambiguation output to be rendered for presentation to the user. For example, assume that the spoken utterance corresponds to "look at John's calendar and schedule a meeting with him this afternoon", but the user of the client device 110 has several work colleagues named "John" (e.g., "John S." and "John C."). In this example, and rather than having the existing third-party text-based chatbot process the ASR output, the disambiguation engine 149 can determine that there is a need to disambiguate which "John" the user of the client device 110 is referring to, and that any context data is insufficient to make this determination. Accordingly, in this example, the disambiguation engine 149 can cause the fulfillment component 143 to generate output of "which John are you referring to? John S. or John C.?" and without prompting the existing third-party text-based chatbot.

Although particular input components are described above, it should be understood that is for the sake of example and is not meant to be limiting. Rather, as indicated above, one or more of the input components can be combined and/or omitted. Further, although the particular input components are described above as having certain functionality, it should also be understood that is for the sake of example and is not meant to be limiting. Rather, it should be understood that these input components can include additional, or alternative, functionalities. Moreover, although each of the input components are described in isolation, it should be understood that multiple input components can be utilized in conjunction, and that processing across multiple of the input components can be shared to further conserve computational resources.

In various implementations, the TTS engine 151 can process, using TTS model(s) stored in the ML model(s) database 120A, textual data (e.g., text formulated by the existing third-party text-based chatbot, text formulated by the voice wrapper, etc.) to generate synthesized speech audio data that captures computer-generated synthesized speech corresponding to an audible response for the textual data. The synthesized speech audio data can be rendered at the client device 110 (or an additional client device of the user of the client device 110) via speaker(s) of the client device 110.

In various implementations, the personality engine 152 can cause responses generated by the existing third-party text-based chatbot to reflect a given persona, from among a plurality of disparate personas, and/or a given voice, from among a plurality of disparate voices. Notably, and prior to the spoken utterance being received, the user of the client device 110 can specify (e.g., via settings of a software application associated with the existing third-party text-based chatbot that is accessible via the application engine 115), the given persona and/or the given voice. Otherwise, the personality engine 152 may utilize a default persona and/or a default voice.

In implementations where the personality engine 152 can causes the existing third-party text-based chatbot to reflect the given persona, the given persona can be embodied by, for example, a given vocabulary that is specific to the given persona and that is utilized in generating to modify responses generated by the existing third-party text-based chatbot. Further, to cause the responses generated by the existing third-party text-based chatbot to reflect the given persona, the personality engine 152 can process, using a ML model stored in the ML model(s) database 120A (e.g., an LLM or the like that is fine-tuned to reflect the given persona or the plurality of different personas), the responses generated by the existing third-party text-based chatbot along with given persona data (e.g., stored in personality database 152A) that is specific to the given persona in generating voice wrapper output, such as a given persona token, a given persona embedding, a given persona vector, and/or other data that can be utilized to tailor the responses to the given persona. The plurality of disparate personas can be defined with varying degrees of granularity. Some non-limiting examples of the plurality of disparate personas can include a formal persona (e.g., a butler, a work colleague, etc.), an informal persona (e.g., a friend, a family member, etc.), a helpful persona (e.g., a life coach, etc.), a verbose persona, a terse persona, and/or other personas. Accordingly, the personality engine 152 can adapt any responses generated by the existing third-party text-based chatbot to reflect the given persona.

Notably, although the LLM engine 145 is depicted as being part of the input component engine 140, the personality engine 152 can optionally cause the LLM engine 145 to process, using the LLM(s) stored in the ML model(s) database 120A, any responses generated by the existing third-party text-based chatbot to reflect the given persona to ensure that it reflects the given persona. For example, many responses generated by the existing third-party text-based chatbot may be relatively verbose since they are intended to be viewed at a display of the client device 110 when they are generated. When the responses generated by the existing third-party text-based chatbot are viewed at the display of the client device 110, the user can consume these responses at their own pace and re-consume prior portions of the responses after consuming latter portions of the response. However, the only way for the user of the client device 110 to re-consume the prior portions of the responses in voice-based conversations is for the user to interrupt a current response that is being rendered and request that the existing third-party repeat the current response from the beginning or a particular point in the current response. Accordingly, the personality engine 152 can cause the LLM engine 145 to process, using the LLM(s) stored in the ML model(s) database 120A, any responses generated by the existing third-party text-based chatbot to reflect (and optionally along with a prompt that is in addition to the response (e.g., "Please summarize this response: [response]")) to ensure the response that is output is terser and more suitable for voice-based conversations. Not only do these modified responses better reflect natural conversations of actual users, but the length of these modified responses that are rendered are reduced compared to the responses generated by the existing third-party text-based chatbot without losing any meaning of these responses. Thus, the human-to-computer dialog can be concluded in a more quick and efficient manner.

In implementations where the personality engine 152 can causes the existing third-party text-based chatbot to reflect the given voice, the given voice can be embodied by, for example, a given corresponding set of prosodic properties utilized in generating synthesized speech audio data that captures synthesized speech corresponding to responses generated by the existing third-party text-based chatbot. The corresponding set of prosodic properties can include, for example, tone, rhythm, pitch, intonation, and/or other prosodic properties that cause the synthesized speech audio data, when audibly rendered, to reflect the given voice. Some non-limiting examples of the plurality of disparate voices can include a male that speaks American English, a female that speaks American English, a male that speaks British English, a female that speaks British English, a male that speaks Mexican Spanish, a female that speaks Mexican Spanish, a male that speaks Spain Spanish, a female that speaks Spain Spanish, and so on. Each of these disparate voices can be associated with corresponding sets of prosodic properties data (e.g., stored in the personality database 152A). Accordingly, when the TTS engine 151 is processing the textual data (e.g., text formulated by the existing third-party text-based chatbot, text formulated by the voice wrapper, etc.) to generate the synthesized speech audio data, the TTS engine 151 can also process the corresponding set of prosodic properties associated with the given voice.

In various implementations, the latency engine 153 can determine whether to cause pre-cached content to be audibly rendered for presentation to the user of the client device 110 while the existing third-party text-based chatbot is processing the ASR output. For example, the latency engine 153 can process, using a latency prediction model (e.g., stored in the ML model(s) database 120A), the ASR output, the NLU output, and/or the fulfillment output to determine a predicted latency for the existing third-party text-based chatbot to generate a response. In this example, if the predicted latency satisfies a latency threshold (e.g., three seconds, five seconds, or other durations of time), then the latency engine 153 can determine to cause the pre-cached content to be audibly rendered for presentation to the user of the client device 110 while the existing third-party text-based chatbot is processing the ASR output. In some implementations, and as depicted in FIG. 1, the latency engine 153 can cause the pre-cached content engine 113 of the client device 110 to obtain the pre-cached content based on the ASR output and/or the NLU output. Further, the latency engine 153 can cause the pre-cached content engine 113 of the client device 110 to tailor the pre-cached content based on the ASR output and/or the NLU output.

For instance, assume that the spoken utterance corresponds to "I'm traveling to Rome next summer, what are some of the must-see attractions". In this example, the existing third-party text-based chatbot may not only generate a response that includes textual content, such as one or more corresponding excerpts associated with different must-see attractions in Rome, but the existing third-party text-based chatbot may also obtain image content of the must-see attractions to be included in the response. However, in obtaining the image content, the existing third-party text-based chatbot may have to determine image queries to submit to an image search system, submit the image queries to the image search system, obtain the images responsive to the image content, and arrange the image content with respect to the textual content. All of these steps introduce latency in the existing third-party text-based chatbot generating the response. Accordingly, in this example, the latency engine 153 can cause the pre-cached content engine 113 to obtain pre-cached content of, for example, "[city] is a great place to visit during [time of season] and has a lot of attractions to offer . . . ". Further, the latency engine 153 can cause the pre-cached content engine 113 to tailor the pre-cached content to the ASR output by inserting "Rome" into the "[city]" placeholder and "the summer" into the "[time of season]" placeholder. By causing the pre-cached content engine 113 to obtain and tailor the pre-cached content to the ASR output, latency (or perceived latency) in causing a response to be rendered can be reduced while the existing third-party text-based chatbot generating the response generates a remainder portion of the response. Accordingly, when the remainder portion of the response is generated by the existing third-party text-based chatbot, the remainder portion of the response can be rendered. Notably, from a perspective of the user of the client device 110 that provided the spoken utterance, the pre-cached content and the remainder portion of the response can be perceived as a single response to the spoken utterance.

Although particular output components are described above, it should be understood that is for the sake of example and is not meant to be limiting. Rather, as indicated above, one or more of the output components can be combined and/or omitted. Further, although the particular output components are described above as having certain functionality, it should also be understood that is for the sake of example and is not meant to be limiting. Rather, it should be understood that these output components can include additional, or alternative, functionalities. Moreover, although each of the output components are described in isolation, it should be understood that multiple output components can be utilized in conjunction, and that processing across multiple of the output components can be shared to further conserve computational resources.

In various implementations, and assuming that the voice wrapper system 120 has some access (e.g., limited access or full access) to the underlying LLM(s) and/or other ML model(s) utilized by the existing third-party text-based chatbot, the fine-tuning engine 160 can be utilized to fine-tune the underlying LLM(s) and/or other ML model(s). For example, the fine-tuning engine 160 can utilize conversations stored in the conversation(s) database 160A in fine-tuning the underlying LLM(s) and/or other ML model(s). In some implementations, the underlying LLM(s) and/or other ML model(s) can be fine-tuned for a particular domain and using conversations that are specific to those domains. For example, if the existing third-party text-based chatbot will subsequently interact with small business, then the fine-tuning engine 160 can utilize a small business domain-relevant corpora of conversations. This enables the underlying LLM(s) and/or other ML model(s) to learn how small businesses conduct conversations, what types of information is typically shared between the small businesses and customers or distributors, and so on. However, if the existing third-party text-based chatbot will subsequently interact with individuals, then the fine-tuning engine 160 can utilize individual domain-relevant corpora of conversation. This enables the underlying LLM(s) and/or other ML model(s) to learn how individuals conduct conversations, what topics they typically discuss, and so on.

In some versions of those implementations, human feedback can be provided as a reinforcement learning signal during the fine-tuning process. For example, a human can provide an indication (e.g., a thumbs up or thumbs down) to indicate whether a particular response that is generated would be suitable for an actual conversation. As another example, a human can provide natural language input that indicates whether a particular response that is generated would be suitable for an actual conversation and why or why not the particular response that is generated would be suitable for an actual conversation, such as the failure of the response to reflect a particular style, the failure of the response to be responsive to a spoken utterance in one or more respects, and/or for other reasons. This critique enables the fine-tuning process to be more efficient in that not only is a binary feedback signal (e.g., a thumbs up or thumbs down) provided, but the actual reason is also provided. This human feedback can be utilized to further refine the underlying LLM(s) and/or other ML model(s) during the fine-tuning process.

Further, although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the voice wrapper system 120 (e.g., over the one or more networks 199). As another example, a given client device can be utilized by multiple users in a shared setting (e.g., a group of users, a household, etc.). Additional description of the request handling engine 130, the input component engine 140, the output component engine 150 is provided herein (e.g., with respect to FIGS. 2-6).

Figure 2:
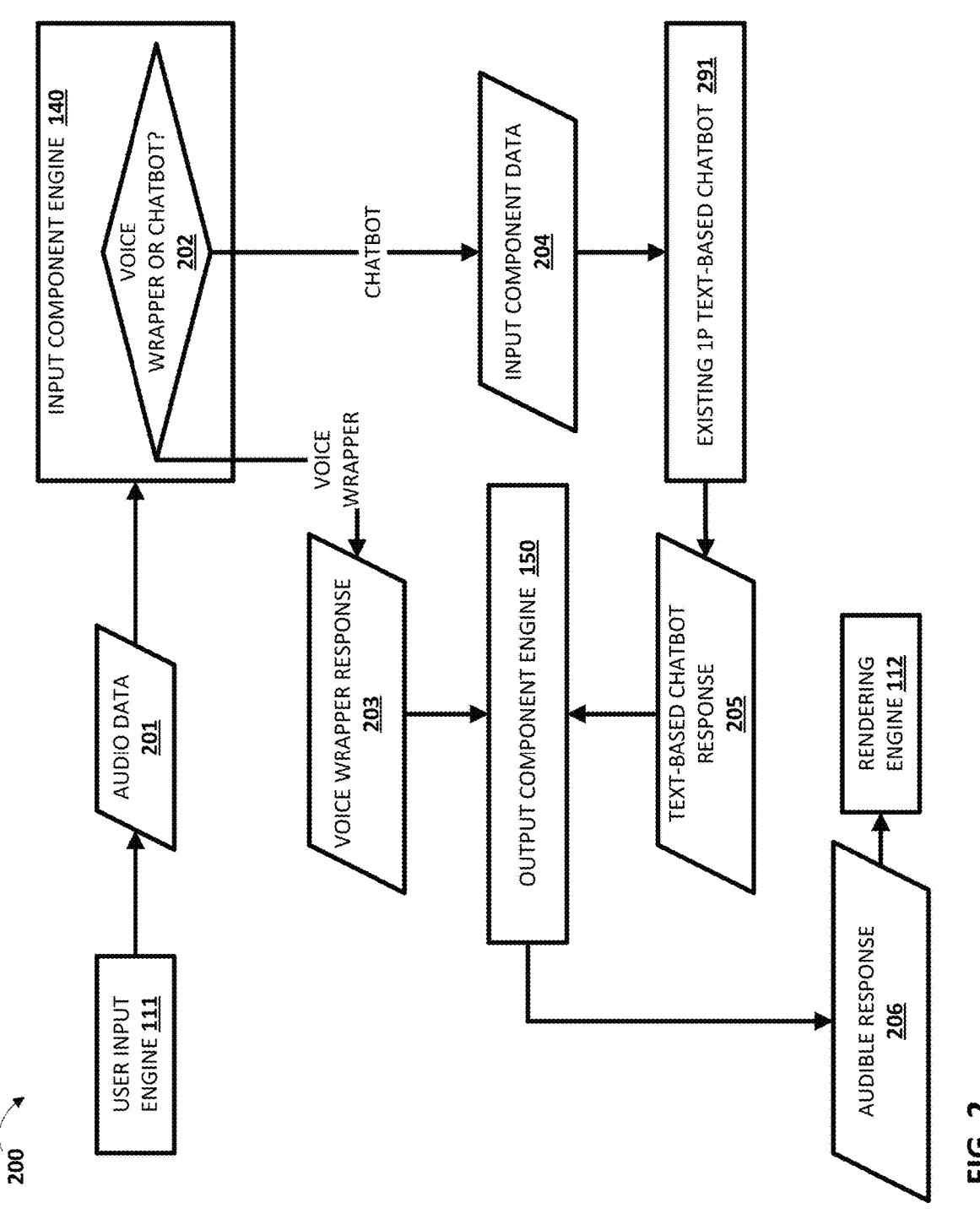
FIG. 2 depicts an example process flow for utilizing a voice wrapper in conjunction with an existing third-party text-based chatbot, in accordance with various implementations.

Referring now to FIG. 2, an example process 200 flow for utilizing a voice wrapper in conjunction with an existing third-party text-based chatbot is depicted. For the sake of example, assume that the user of the client device 110 from FIG. 1 provides a spoken utterance as input at the client device 110 directed to an existing third-party text-based chatbot 291 is accessible via the client device 110 and as part of a corresponding conversation between the user of the client device 110 and the existing third-party text-based chatbot 291. The client device 110 may receive the spoken utterance via the user input engine 111 of the client device 110, and may generate audio data 201 that captures the spoken utterance. For the sake of example, assume that a voice wrapper is being utilized in conjunction with the existing third-party text-based chatbot 291.

Initially, the input component engine 140 of the voice wrapper can process the audio data 201 (e.g., using one or more of the various sub-engines described with respect to FIG. 1) to determine whether the voice wrapper should respond to the spoken utterance captured in the audio data 201 or the existing third-party text-based chatbot 291 should respond to the spoken utterance captured in the audio data 201 (e.g., as described with respect to FIG. 3) and as indicated at 202. Assuming that the voice wrapper determines that it should respond to the spoken utterance captured in the audio data 201, the voice wrapper can utilize the input component engine 140 to generate a voice wrapper response 203 that is then provided to the output component engine 150 of the voice wrapper. However, and assuming that the voice wrapper determines that the existing third-party text-based chatbot 291 should respond to the spoken utterance captured in the audio data 201, the voice wrapper can determine what to provide to the existing third-party text-based chatbot 291 (e.g., ASR output that corresponds to the spoken utterance, or voice wrapper output that is based on the ASR output but differs from the ASR output, and as described with respect to FIG. 4), and can pass input component data 204 to the existing third-party text-based chatbot 291. In turn, the existing third-party text-based chatbot 291 can process the input component data 204 to generate a text-based chatbot response 205 that is then provided to the output component engine 150 of the voice wrapper.

Notably, the input component data 204 can include one or more additional prompts (e.g., in addition to the ASR output, the NLU output, the fulfillment output, and/or the LLM output generated based on processing the audio data 201 using the input component engine 140). For instance, the input component data 204 can include hard or soft prompts for the existing third-party text-based chatbot to also process even if these hard or soft prompts were not explicitly included in the spoken utterance or at the direction of the user that provided the spoken utterance that is captured in the audio data 201. In these and other manners described herein (e.g., with respect to the fine-tuning engine 160), the input component engine 140 can prompt tune the existing third-party text-based chatbot to increase the likelihood that it will elicit certain behaviors, generate responses in certain styles, etc. As some non-limiting examples of these hard or soft prompts, the input component data 204 can, for instance, indicate a certain persona, behavior, or style to be reflected by the existing third-party text-based chatbot, a length of a response to be generated by the existing third-party text-based chatbot, an indication to summarize any responses that are generated, and/or other hard or soft prompts.

Subsequently, the output component engine 150 of the voice wrapper can process the voice wrapper response 203 and/or the text-based chatbot response 205 to generate an audible response 206 that is provided to the rendering engine 112 for audible rendering at the client device 110 of the user that provided the spoken utterance (e.g., as described with respect to FIG. 5). Notably, even in implementations where the voice wrapper determines that the existing third-party text-based chatbot 291 should respond to the spoken utterance captured in the audio data 201, the voice wrapper response 203 can be still be generated, such as in implementations where pre-cached content is rendered to reduce latency (e.g., as described with respect to FIG. 6).

Although the process flow 200 is described with respect to the voice wrapper being utilized in conjunction with the existing third-party text-based chatbot 291 in responding to a single turn of the corresponding conversation, it should be understood that is for the sake of example and is not meant to be limiting. Rather, it should be understood that the corresponding conversation can include multiple turns of dialog. Further, although the process flow 200 is described with respect to the existing text-based chatbot being an existing third-party text-based chatbot, it should be understood that is for the sake of example and is not meant to be limiting. For instance, the existing text-based chatbot can alternatively be a first-party text-based chatbot.

Turning now to FIG. 3, a flowchart illustrating an example method 300 of determining whether to utilize a voice wrapper or an existing third-party text-based chatbot in responding to a spoken utterance is depicted. For convenience, the operations of the method 300 are described with reference to a system that performs the operations. This system of the method 300 includes at least one processor, memory, and/or other component(s) of computing device(s) (e.g., client device 110 of FIG. 1, voice wrapper system 120 of FIG. 1, computing device 710 of FIG. 7 and/or other computing devices). Moreover, while operations of the method 300 are shown in a particular order, this is not meant to be limiting. One or more operations may be reordered, omitted, and/or added.

At block 352, the system receives, from a first-party entity, a voice wrapper for an existing third-party text-based chatbot that is managed by a third-party entity, the third-party entity being distinct from the first-party entity, and the voice wrapper including a plurality of components. The plurality of components can include, for example, a plurality of input components to process spoken utterances on behalf of the existing third-party text-based chatbot, and a plurality of output components to modify or supplement a response that is generated by the existing third-party text-based chatbot. In some implementations, the third-party entity can request that the first-party provide the voice wrapper to supplement functionality of the existing third-party text-based chatbot, whereas in other implementations, the first-party entity can proactively provide the voice wrapper to the third-party, or otherwise make available to the third-party entity (e.g., via a marketplace). Moreover, in implementations where the existing text-based chatbot is an existing first-party text-based chatbot, the system may identify the voice wrapper for the existing first-party text-based chatbot.

At block 354, the system receives, as part of a corresponding conversation with a human user via a client device of the human user, audio data that captures a spoken utterance of the human user. The audio data can be generated via microphone(s) of the client device of the client device. In some implementations, the human user can provide the spoken utterance while interacting with an application that is associated with the existing third-party text-based chatbot. In some versions of those implementations, the audio data may only be generated in response to the human user providing explicit input to capture the spoken utterance (e.g., via actuation of a hardware or software button of the client device, via speaking a particular word or phrase to invoke the existing third-party text-based chatbot, etc.). In other versions of those implementations, the human user need not provide any explicit input to capture the spoken utterance.

At block 356, the system processes, using an automatic speech recognition (ASR) component, of the components of the voice wrapper, the audio data that captures the spoken utterance to generate ASR output. For example, the system can cause the ASR engine 142 from FIG. 1 to process the audio data capturing the spoken utterance to generate the ASR output.

At block 358, the system determines whether to utilize the voice wrapper or the existing third-party text-based chatbot in responding to the spoken utterance. The system can determine whether to utilize the voice wrapper or the existing third-party text-based chatbot in responding to the spoken utterance based on, for example, whether the spoken utterance is an interruption (or, more specifically, a type of the interruption), whether there is a need to disambiguate the spoken utterance, and/or based on other factors. Notably, the voice wrapper may be more computationally efficient than the existing third-party text-based chatbot. Accordingly, by using the voice wrapper to respond to the spoken utterance in certain scenarios, and in lieu of the existing third-party text-based chatbot, the system can conserve computational resources that would otherwise be consumed absent the voice wrapper.

Notably, in various implementations, the system can also wait to determine whether to utilize the voice wrapper or the existing third-party text-based chatbot in responding to the spoken utterance (e.g., until it is determined the user is done providing the spoken utterance as described with respect to the endpointing engine 146 of FIG. 1). Nonetheless, in these implementations, the system can cause the voice wrapper and/or the existing third-party text-based chatbot to initiate processing of the ASR output (or a portion thereof) in a streaming manner to reduce latency in generating a response to the spoken utterance. Accordingly, when the system does determine whether to utilize the voice wrapper or the existing third-party text-based chatbot in responding to the spoken utterance, the system can cause the voice wrapper or the existing third-party text-based chatbot to refrain from further processing of the ASR output, and continue processing of the ASR output with the other one of the voice wrapper or the existing third-party text-based chatbot. Accordingly, the system enables the voice wrapper and/or the existing third-party text-based chatbot to respond to the spoken utterance in a more conversational, fluidic manner that better resonates with the user that provided the spoken utterance.

In implementations where the spoken utterance is an interruption that interrupts a current response that is being rendered, the system can process, using an interruption classifier, the ASR output and/or other output that is generated based on processing the ASR output (e.g., natural language understanding (NLU) output, fulfillment output, and/or large language model (LLM) output). The system can determine, based on output generated by the interruption classifier, the type of the interruption, and cause subsequent processing of the spoken utterance to be adapted based on the type of the interruption. The types of interruptions can include, for example, non-critical interruptions, critical interruptions, and/or other types of interruptions defined with varying degrees of granularity. The output generated by the interruption classifier can include, for example, a corresponding numerical measure (e.g., binary value, probability, log likelihood, and/or other numerical measures) associated with a plurality of disparate types of interruptions. The system can determine the type of interruption based on the corresponding numerical measures (e.g., the type of interruption associated with the highest corresponding numerical measure).

For example, and assuming that the spoken utterance is an interruption that does not substantively alter a course of the corresponding conversation (e.g., a non-critical interruption), then the system can determine that the voice wrapper should respond to the spoken utterance. For instance, if the spoken utterance asks that a current response that is being rendered (e.g., when the spoken utterance is received) be repeated, then the system can cause the voice wrapper to cause the rendering of the current response to be ceased, and cause the current response to be repeated from the beginning. Also, for instance, if the spoken utterance includes filler speech or words of affirmation, then the system can cause the voice wrapper to refrain from causing the rendering of the current response to be ceased, and also refrain from providing anything to the existing third-party text-based chatbot (e.g., the system can continue to cause the current response to be rendered).

However, and assuming that the spoken utterance is an interruption that does substantively alter a course of the corresponding conversation (e.g., a critical interruption), then the system can determine that the existing third-party text-based chatbot should respond to the spoken utterance. For instance, if the spoken utterance includes an entirely unrelated query or prompt (e.g., that is unrelated to a current response that is being rendered when the spoken utterance is received), then the system can cause the voice wrapper to cause the rendering of the current response to be ceased, and cause the existing third-party text-based chatbot to respond to the spoken utterance (and assuming there is no other reason for the voice wrapper to handle the spoken utterance).

In implementations where there is a need to disambiguate the spoken utterance (e.g., determined based on the ASR output and/or other output that is generated based on processing the ASR output (e.g., natural language understanding (NLU) output, fulfillment output, and/or large language model (LLM) output)), the system can cause the voice wrapper to attempt to disambiguate the spoken utterance without prompting the user (e.g., using content data and/or other data available to the system). For instance, if the ASR output, NLU output, and/or LLM output indicate that a parameter for a slot value is unknown or ambiguous, or the fulfillment output indicates that fulfillment cannot be completed due to a parameter for a slot value being unknown, then the system can attempt to disambiguate the utterance without prompting the user. However, in implementations where the system cannot disambiguate the spoken utterance without prompting the user, then the system can determine to utilize the voice wrapper to respond to the spoken utterance to disambiguate the spoken utterance.

If, at an iteration of block 358, the system determines to utilize the voice wrapper in responding to the spoken utterance, then the system proceeds to block 360. At block 360, the system processes, using one or more of the components of the voice wrapper, at least the ASR output to generate a voice wrapper response that is responsive to the spoken utterance. In implementations where the spoken utterance is an interruption that interrupts a current response that is being rendered and the interruption is a non-critical interruption, the system can utilize, for example, the NLU engine 143, the fulfillment engine 144, and/or the LLM engine 145 to generate the voice wrapper response. In implementations where there is a need to disambiguate the spoken utterance the system can utilize, for example, the NLU engine 143, the fulfillment engine 144, and/or the LLM engine 145 to generate the voice wrapper response and based on the output generated using the disambiguation engine (e.g., that indicates there is insufficient information to properly respond to the spoken utterance).

At block 362, the system causes the voice wrapper response to be audibly rendered for presentation to the human user via one or more speakers of the client device. Notably, the voice wrapper response may be text-based, and the system can cause a text-to-speech (TTS) component, of the components of the voice wrapper, to process the voice wrapper response to generate synthesized speech audio data that captures synthesized speech corresponding to the voice wrapper response. The synthesized speech audio data can then be audibly rendered via the one or more speakers of the client device of the human user. The system returns to block 354 to receive, as part of the corresponding conversation with the human user, additional audio data that captures an additional spoken utterance of the human user. The system continues with another iteration of the method 300.

If, at an iteration of block 356, the system determines to utilize the existing third-party text-based chatbot in responding to the spoken utterance, then the system proceeds to block 364. At block 364, the system processes, using the existing third-party text-based chatbot, at least the ASR output to generate an existing third-party text-based chatbot response that is responsive to the spoken utterance. At block 366, the system causes the existing third-party text-based chatbot response to be audibly rendered for presentation to the human user via one or more speakers of the client device. Notably, the existing third-party text-based chatbot response, and the system can cause a text-to-speech (TTS) component, of the components of the voice wrapper, to process the existing third-party text-based chatbot response to generate synthesized speech audio data that captures synthesized speech corresponding to the existing third-party text-based chatbot response. The synthesized speech audio data can then be audibly rendered via the one or more speakers of the client device of the human user. The system returns to block 354 to receive, as part of the corresponding conversation with the human user, additional audio data that captures an additional spoken utterance of the human user. The system continues with another iteration of the method 300.

Turning now to FIG. 4, a flowchart illustrating an example method 400 of utilizing a voice wrapper to modify input provided to an existing third-party text-based chatbot in responding to a spoken utterance is depicted. For convenience, the operations of the method 400 are described with reference to a system that performs the operations. This system of the method 400 includes at least one processor, memory, and/or other component(s) of computing device(s) (e.g., client device 110 of FIG. 1, voice wrapper system 120 of FIG. 1, computing device 710 of FIG. 7 and/or other computing devices). Moreover, while operations of the method 400 are shown in a particular order, this is not meant to be limiting. One or more operations may be reordered, omitted, and/or added.

At block 452, the system receives, from a first-party entity, a voice wrapper for an existing third-party text-based chatbot that is managed by a third-party entity, the third-party entity being distinct from the first-party entity, and the voice wrapper including a plurality of components. At block 454, the system receives, as part of a corresponding conversation with a human user via a client device of the human user, audio data that captures a spoken utterance of the human user. At block 456, the system processes, using an automatic speech recognition (ASR) component, of the components of the voice wrapper, the audio data that captures the spoken utterance to generate ASR output. The operations of blocks 452-456 can be performed in the same or similar manner described above with respect to blocks 352-356, respectively, of the method 300 of FIG. 3.

At block 458, the system determines whether to generate voice wrapper output that is based on the ASR output, but differs from the ASR output. The system can determine whether to generate the voice wrapper output that is based on the ASR output, but differs from the ASR output based on, for example, the ASR output itself and/or other output that is generated based on processing the ASR output (e.g., natural language understanding (NLU) output, fulfillment output, and/or large language model (LLM) output). For example, if the spoken utterance includes filler speech, stop words, and/or other speech that does not meaningfully contribute to the spoken utterance or an interpretation of the spoken utterance, then the system can determine to generate the voice wrapper output that is based on the ASR output, but differs from the ASR output, to remove the filler speech, stop words, and/or other speech that does not meaningfully contribute to the spoken utterance or the interpretation of the spoken utterance. As another example, if there is a need to bias the ASR output and/or NLU output, that is generated based on processing the ASR output, then the system can determine to generate the voice wrapper output that is based on the ASR output, but differs from the ASR output, to bias the ASR output toward a desired interpretation. This enables the system to disambiguate the spoken utterance without having to prompt the user for clarification.

If, at an iteration of block 458, the system determines to generate the voice wrapper output that is based on the ASR output, but differs from the ASR output, then the system proceeds to block 460. At block 460, the system processes, using a modification component, of the components of the voice wrapper, the ASR output to generate the voice wrapper output that is based on the ASR output, but differs from the ASR output. In implementations where the ASR output includes the filler speech, stop words, and/or other speech that does not meaningfully contribute to the spoken utterance or an interpretation of the spoken utterance, the system can cause the modification component to process the ASR output to remove speech hypotheses corresponding to the filler speech, stop words, and/or other speech that does not meaningfully contribute to the spoken utterance or the interpretation of the spoken utterance. In implementations where there is a need to bias the ASR output and/or NLU output, that is generated based on processing the ASR output, then the system can supplement the ASR output to clarify the desired interpretation of the spoken utterance.

At block 462, the system processes, using the existing third-party text-based chatbot, at least the voice wrapper output to generate an existing third-party text-based chatbot response that is responsive to the spoken utterance. Accordingly, rather than processing the ASR output itself, the system can cause the existing third-party text-based chatbot to process the voice wrapper output. In implementations where the voice wrapper output corresponds to the ASR output, but with the filler speech, stop words, and/or other speech that does not meaningfully contribute to the spoken utterance removed, the processing by the existing third-party text-based chatbot is more computationally efficient since the existing third-party text-based chatbot processes a shorter input (e.g., fewer tokens) in generating the existing third-party text-based chatbot response that is responsive to the spoken utterance. Further, in implementations where the voice wrapper output corresponds to the ASR output, and that is supplemented based on biasing the ASR output, the processing by the existing third-party text-based chatbot is still more computationally efficient, in the aggregate, since this eliminates and/or mitigates occurrences where the existing third-party text-based chatbot needs to prompt for clarification of the spoken utterance, thereby prolonging a human-to-computer interaction.

At block 464, the system causes the existing third-party text-based chatbot response to be audibly rendered for presentation to the human user via one or more speakers of the client device. The operations of blocks 464 can be performed in the same or similar manner described above with respect to blocks 366 of the method 300 of FIG. 3. The system returns to block 454 to receive, as part of the corresponding conversation with the human user, additional audio data that captures an additional spoken utterance of the human user. The system continues with another iteration of the method 400.

If, at an iteration of block 458, the system determines not to generate the voice wrapper output that is based on the ASR output, but differs from the ASR output, then the system proceeds to block 466. At block 466, the system processes, using the existing third-party text-based chatbot, at least the ASR output to generate an existing third-party text-based chatbot response that is responsive to the spoken utterance. In these implementations, the ASR output may not include any filler speech, stop words, and/or other speech that does not meaningfully contribute to the spoken utterance that needs to be removed. Further, in these implementations, the ASR output may not need to be biased. Accordingly, the system can pass the ASR output directly to the existing third-party text-based chatbot for processing of the ASR output to generate the existing third-party text-based chatbot response that is responsive to the spoken utterance.

At block 468, the system causes the existing third-party text-based chatbot response to be audibly rendered for presentation to the human user via one or more speakers of the client device. The operations of blocks 468 can be performed in the same or similar manner described above with respect to blocks 366 of the method 300 of FIG. 3. The system returns to block 454 to receive, as part of the corresponding conversation with the human user, additional audio data that captures an additional spoken utterance of the human user. The system continues with another iteration of the method 400.

Turning now to FIG. 5, a flowchart illustrating an example method 500 of utilizing a voice wrapper to cause an existing third-party text-based chatbot to exhibit a given persona or a given voice is depicted. For convenience, the operations of the method 500 are described with reference to a system that performs the operations. This system of the method 500 includes at least one processor, memory, and/or other component(s) of computing device(s) (e.g., client device 110 of FIG. 1, voice wrapper system 120 of FIG. 1, computing device 710 of FIG. 7 and/or other computing devices). Moreover, while operations of the method 500 are shown in a particular order, this is not meant to be limiting. One or more operations may be reordered, omitted, and/or added.

At block 552, the system receives, from a first-party entity, a voice wrapper for an existing third-party text-based chatbot that is managed by a third-party entity, the third-party entity being distinct from the first-party entity, and the voice wrapper including a plurality of components. At block 554, the system receives, as part of a corresponding conversation with a human user via a client device of the human user, audio data that captures a spoken utterance of the human user. At block 556, the system processes, using an automatic speech recognition (ASR) component, of the components of the voice wrapper, the audio data that captures the spoken utterance to generate ASR output. The operations of blocks 552-556 can be performed in the same or similar manner described above with respect to blocks 352-356, respectively, of the method 300 of FIG. 3.

At block 558, the system processes, using the existing third-party text-based chatbot, at least the ASR output to generate an existing third-party text-based chatbot response that is responsive to the spoken utterance. The operations of blocks 558 can be performed in the same or similar manner described above with respect to blocks 364 of the method 300 of FIG. 3.

At block 560, the system determines whether to cause the existing third-party text-based chatbot response to reflect a given persona, from among a plurality of disparate personas, and/or a given voice, from among a plurality of disparate voices. For example, the human user that provided the spoken utterance can specify that any interaction with the existing third-party text-based chatbot should reflect the given persona and/or the given voice in, for instance, settings of an application that is associated with the existing third-party text-based chatbot and that is accessible via the client device of the human user. Otherwise, the system may utilize a default persona and/or a default voice.

If, at an iteration of block 560, the system determines to cause the existing third-party text-based chatbot response to reflect the given persona, then the system proceeds to block 562. At block 562, the system processes, using a personality component, of the components of the voice wrapper, the existing third-party text-based chatbot response to generate voice wrapper response that is based on the existing third-party text-based chatbot response, but differs from the existing third-party text-based chatbot response. For example, assume that the spoken utterance corresponds to "Good morning chatbot, how are you?", and the existing third-party text-based chatbot response, generated based on processing at least the ASR output, corresponds to "Hello, I'm doing well today, any plans today?". In this example, further assume that the given persona assigned to the existing third-party text-based chatbot is a formal persona (e.g., a butler or the like). Accordingly, the system can cause the personality component to process the existing third-party text-based chatbot response to generate voice wrapper response of "Good morning sir/ma'am, I'm surely swell on this lovely morning, how do you plan to proceed about your day?". In contrast, further assume that the given persona assigned to the existing third-party text-based chatbot is an informal persona (e.g., a friend or the like). Accordingly, the system can cause the personality component to process the existing third-party text-based chatbot response to generate voice wrapper response of "What's crackin, I'm just kickin it, what we doin today?". Notably, in each of these examples, the content of the response conveys the same substance—a greeting, a direct response, and a question about the day to drive the conversation. However, the language used to convey the response in each of these examples varies to reflect the given persona that is assigned to the existing third-party text-based chatbot, and the length of the response varies. The system can optionally employ LLM(s) in generate these responses in the different personas.

At block 564, the system processes, using a text-to-speech (TTS) component, of the components of the voice wrapper, at least the voice wrapper response to generate an audible response. At block 566, the system causes the audible response to be audibly rendered for presentation to the human user via one or more speakers of the client device. The operations of blocks 564 and 566 can be performed in the same or similar manner described above with respect to blocks 362 of the method 300 of FIG. 3. The system returns to block 554 to receive, as part of the corresponding conversation with the human user, additional audio data that captures an additional spoken utterance of the human user. The system continues with another iteration of the method 500.

If, at an iteration of block 560, the system determines to cause the existing third-party text-based chatbot response to reflect the given voice, then the system proceeds to block 568. At block 568, the system selects, using a personality component, of the components of the voice wrapper, a corresponding set of prosodic properties for the given voice. For example, assume that the given voice assigned to the existing third-party text-based chatbot is a butler or the like. Accordingly, the system can cause the personality component to select a corresponding set of prosodic properties stored in associated with a butler voice such that, when the existing third-party text-based chatbot response is rendered, it will sound like it was spoken by a stereotypical butler.

At block 570, the system processes, using a text-to-speech (TTS) component, of the components of the voice wrapper, the existing third-party text-based chatbot response and the corresponding set of prosodic properties to generate an audible response. At block 572, the system causes the audible response to be audibly rendered for presentation to the human user via one or more speakers of the client device. The operations of blocks 564 and 566 can be performed in the same or similar manner described above with respect to blocks 362 of the method 300 of FIG. 3. However, in processing the existing third-party text-based chatbot response, the system also causes the TTS component to process the corresponding set of prosodic properties to ensure that the audible response reflects the given voice. The system returns to block 554 to receive, as part of the corresponding conversation with the human user, additional audio data that captures an additional spoken utterance of the human user. The system continues with another iteration of the method 500.

Although the method 500 of FIG. 5 is described with respect to the given persona or the given voice being assigned to the existing third-party text-based chatbot, it should be understood that is for the sake of illustrating various techniques contemplated herein and is not meant to be limiting. Rather, it should be understood that both a given persona and a given voice can be assigned to the existing third-party text-based chatbot.

Turning now to FIG. 6, a flowchart illustrating an example method 600 of determining whether to utilize a voice wrapper to cause pre-cached content to be audibly rendered while an existing third-party text-based chatbot is generating a response is depicted. For convenience, the operations of the method 600 are described with reference to a system that performs the operations. This system of the method 600 includes at least one processor, memory, and/or other component(s) of computing device(s) (e.g., client device 110 of FIG. 1, voice wrapper system 120 of FIG. 1, computing device 710 of FIG. 7 and/or other computing devices). Moreover, while operations of the method 600 are shown in a particular order, this is not meant to be limiting. One or more operations may be reordered, omitted, and/or added.

At block 652, the system receives, from a first-party entity, a voice wrapper for an existing third-party text-based chatbot that is managed by a third-party entity, the third-party entity being distinct from the first-party entity, and the voice wrapper including a plurality of components. At block 654, the system receives, as part of a corresponding conversation with a human user via a client device of the human user, audio data that captures a spoken utterance of the human user. At block 656, the system processes, using an automatic speech recognition (ASR) component, of the components of the voice wrapper, the audio data that captures the spoken utterance to generate ASR output. The operations of blocks 652-656 can be performed in the same or similar manner described above with respect to blocks 352-356, respectively, of the method 300 of FIG. 3.

At block 658, the system determines whether to cause pre-cached content to be rendered. The system can determine whether to cause pre-cached content to be rendered based on, for example, a predicted latency in causing the existing third-party text-based chatbot to generate an existing third-party text-based chatbot response. Further, the system can determine the predicted latency using a latency prediction model. Moreover, the system can determine to cause the pre-cached content to be rendered if the predicted latency satisfies a latency threshold. Some non-limiting examples of when the predicted latency satisfies the latency threshold can include, for instance, scenarios when the existing third-party text-based chatbot has to interact with one or more external systems, the spoken utterance is relatively complex, the spoken utterances includes a request for information that is not readily available (e.g., the information is based on an occurrence of a future event), and/or in other scenarios.

If, at an iteration of block 658, the system determines to cause the pre-cached content to be rendered then the system proceeds to block 660. At block 660, the system causes the pre-cached content to be obtained and/or tailored. In some implementations, the pre-cached content may be stored locally at the client device of the human user (e.g., via an application that is associated with the existing third-party text-based chatbot). In these implementations, the system can instruct the application to obtain the pre-cached content and/or tailor it to the spoken utterance. Notably, while the system causes the pre-cached content to be obtained and/or tailored at block 660, the system can also proceed to block 666 to cause the existing third-party text-based chatbot to process the ASR output to generate an existing third-party text-based chatbot response. Block 666 is described in more detail below.

At block 662, the processes, using a text-to-speech (TTS) component, of the components of the voice wrapper, the pre-cached content. At block 664, the system causes the pre-cached content to be audibly rendered for presentation to the human user via one or more speakers of the client device. The operations of blocks 662 and 664 can be performed in the same or similar manner described above with respect to blocks 362 of the method 300 of FIG. 3.

If, at an iteration of block 658, the system determines not to cause the pre-cached content to be rendered then the system proceeds to block 666. At block 666, the system processes, using the existing third-party text-based chatbot, at least the ASR output to generate an existing third-party text-based chatbot response that is responsive to the spoken utterance. At block 668, the system processes, using a text-to-speech (TTS) component, of the components of the voice wrapper, the existing third-party text-based chatbot response. At block 670, the system causes the existing third-party text-based chatbot response to be audibly rendered for presentation to the human user via one or more speakers of the client device. The operations of blocks 666-670 can be performed in the same or similar manner described above with respect to blocks 364 and 366 of the method 300 of FIG. 3. The system returns to block 654 to receive, as part of the corresponding conversation with the human user, additional audio data that captures an additional spoken utterance of the human user. The system continues with another iteration of the method 600.

However, in implementations where the system determines to cause the pre-cached content to be rendered, the pre-cached content and the existing third-party text-based chatbot response can be audibly perceived by the human user as a single response. Accordingly, from a perspective of the human user, it will appear as if the pre-cached content was generated by the existing third-party text-based chatbot, thereby reducing perceived latency.

Although methods 300, 400, 500, and 600 of FIGS. 3, 4, 5, 6, and 7, respectively, are depicted as distinct methods, it should be understood that is for the sake of illustrating various techniques contemplated herein and is not meant to be limiting. For instance, techniques of multiple of the methods 300, 400, 500, and 600 may be combined to provide a cohesive voice wrapper that works in conjunction with the existing third-party text-based chatbot, and the different functionalities utilized by the voice wrapper are dependent on the spoken utterance that is provided by the human user.

Figure 7:
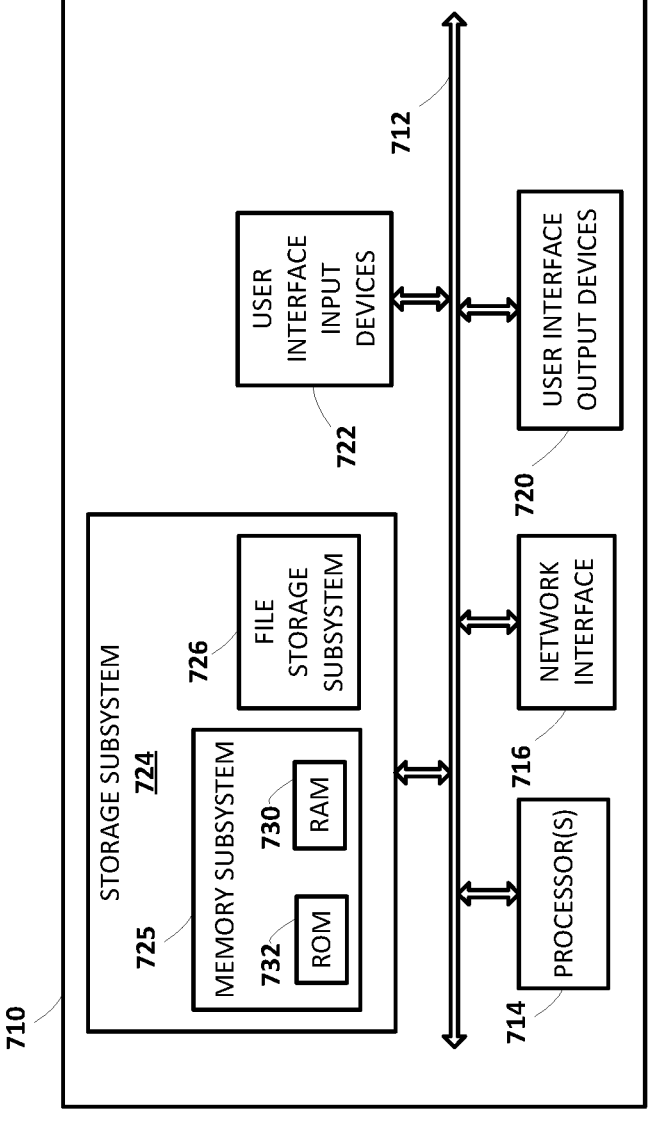
FIG. 7 depicts an example architecture of a computing device, in accordance with various implementations.

Turning now to FIG. 7, a block diagram of an example computing device 710 that may optionally be utilized to perform one or more aspects of techniques described herein. In some implementations, one or more of a client device, a voice wrapper system, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors.

Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving, from a first-party entity, a voice wrapper for an existing third-party text-based chatbot that is managed by a third-party entity, the third-party entity being distinct from the first-party entity, and the voice wrapper including a plurality of components that enable the existing third-party text-based chatbot to engage in corresponding voice-based conversations with corresponding human users; and causing the existing third-party text-based chatbot to engage in a given voice-based conversation with a given human user via a client device of the given human user. Causing the existing third-party text-based chatbot to engage in the given voice-based conversation with the given human user includes: receiving audio data that captures a spoken utterance provided by the given human user; determining, based on processing the audio data that captures the spoken utterance and using one or more of the plurality of components of the voice wrapper, whether to utilize the voice wrapper in responding to the spoken utterance or the existing third-party text-based chatbot in responding to the spoken utterance; and in response to determining to utilize the voice wrapper in responding to the spoken utterance: processing, using one or more of the plurality of components of the voice wrapper and without using the existing third-party text-based chatbot, the audio data that captures the spoken utterance to generate a voice wrapper response that is responsive to the spoken utterance; and causing the voice wrapper response that is responsive to the spoken utterance to be audibly rendered for presentation to the given human user via one or more speakers of the client device of the given human user.

These and other implementations of technology disclosed herein can optionally include one or more of the following features.

In some implementations, the spoken utterance may be an interruption that interrupts a current response that is being audibly rendered for presentation to the given human user via the one or more speakers of the client device of the given human user, and determining whether to utilize the voice wrapper in responding to the spoken utterance or the existing third-party text-based chatbot in responding to the spoken utterance based on processing the audio data that captures the spoken utterance and using one or more of the plurality of components of the voice wrapper may include: processing, using an automatic speech recognition (ASR) component, of the plurality of components, of the voice wrapper, the audio data that captures the spoken utterance to generate ASR output that corresponds to the spoken utterance; processing, using an interruption component, of the plurality of components, of the voice wrapper, the ASR output, or natural language understanding (NLU) output, that is generated by the voice wrapper based on processing the ASR output, to determine a type of the interruption, from among a plurality of disparate types of interruptions; and determining, based on the type of interruption, whether to utilize the voice wrapper in responding to the spoken utterance or the existing third-party text-based chatbot in responding to the spoken utterance.

In some versions of those implementations, the plurality of disparate types of interruptions may include at least a non-critical interruption and a critical interruption.

In some further versions of those implementations, determining to utilize the voice wrapper in responding to the spoken utterance may be in response to determining that the type of interruption is the non-critical interruption.

In some yet further versions of those implementations, processing the audio data that captures the spoken utterance to generate the voice wrapper response that is responsive to the spoken utterance and using one or more of the plurality of components of the voice wrapper and without using the existing third-party text-based chatbot may include: processing, using a fulfillment component, of the plurality of components, of the voice wrapper, the ASR output and/or the NLU output, to generate the voice wrapper response that is responsive to the spoken utterance.

In some even yet further versions of those implementations, causing the voice wrapper response that is responsive to the spoken utterance to be audibly rendered for presentation to the given human user via the one or more speakers of the client device of the given human user may include: processing, using a text-to-speech (TTS) component, of the plurality of components, of the voice wrapper, the voice wrapper response to generate synthesized speech audio data that captures synthesized speech corresponding to an audible response for the voice wrapper response; ceasing the current response from being audibly rendered for presentation to the given human user via the one or more speakers of the client device of the given human user; and causing the audible response for the voice wrapper response that is responsive to the spoken utterance to be audibly rendered for presentation to the given human user via the one or more speakers of the client device of the given human user.

In additional or alternative further versions of those implementations, determining to utilize the existing third-party text-based in responding to the spoken utterance may be in response to determining that the type of interruption is the critical interruption.

In some yet further versions of those implementations, the method may further include: in response to determining to utilize the existing third-party text-based chatbot in responding to the spoken utterance: processing, using the existing third-party text-based chatbot, the ASR output generated by the voice wrapper to generate an existing third-party text-based chatbot response that is responsive to the spoken utterance; ceasing the current response from being audibly rendered for presentation to the given human user via the one or more speakers of the client device of the given human user; and causing the existing third-party text-based chatbot response that is responsive to the spoken utterance to be audibly rendered for presentation to the given human user via the one or more speakers of the client device of the given human user.

In some even yet further versions of those implementations, causing the existing third-party text-based chatbot response that is responsive to the spoken utterance to be audibly rendered for presentation to the given human user via the one or more speakers of the client device of the given human user may include: processing, using a text-to-speech (TTS) component, of the plurality of components, of the voice wrapper, the existing third-party text-based chatbot response to generate synthesized speech audio data that captures synthesized speech corresponding to an audible response for the existing third-party text-based chatbot response; and causing the audible response for the existing third-party text-based chatbot response that is responsive to the spoken utterance to be audibly rendered for presentation to the given human user via the one or more speakers of the client device of the given human user.

In additional or alternative even yet further versions of those implementations, the method may further include, while the existing third-party text-based chatbot is processing the ASR output generated by the voice wrapper to generate the existing third-party text-based chatbot response that is responsive to the spoken utterance: determining, using a latency component, from among the plurality of components, of the voice wrapper, to cause pre-cached content to be audibly rendered for presentation to the given human user via one or more speakers of the client device of the given human user; and causing the pre-cached content to be audibly rendered for presentation to the given human user via the one or more speakers of the client device of the given human user.

In some implementations, determining whether to utilize the voice wrapper in responding to the spoken utterance or the existing third-party text-based chatbot in responding to the spoken utterance based on processing the audio data that captures the spoken utterance and using one or more of the plurality of components of the voice wrapper may include: processing, using an automatic speech recognition (ASR) component, of the plurality of components, of the voice wrapper, the audio data that captures the spoken utterance to generate ASR output that corresponds to the spoken utterance; processing, using a disambiguation component, of the plurality of components, of the voice wrapper, the ASR output, or natural language understanding (NLU) output, that is generated by the voice wrapper based on processing the ASR output, to determine whether a need exists to disambiguate the spoken utterance; and determining, based on whether the need exists to disambiguate the spoken utterance, whether to utilize the voice wrapper in responding to the spoken utterance or the existing third-party text-based chatbot in responding to the spoken utterance.

In some versions of those implementations, determining to utilize the voice wrapper in responding to the spoken utterance may be in response to determining that the need exists to disambiguate the spoken utterance.

In some further versions of those implementations, processing the audio data that captures the spoken utterance to generate the voice wrapper response that is responsive to the spoken utterance and using one or more of the plurality of components of the voice wrapper and without using the existing third-party text-based chatbot may include: processing, using a fulfillment component, of the plurality of components, of the voice wrapper, the ASR output and/or the NLU output, to generate the voice wrapper response that is responsive to the spoken utterance.

In some yet further versions of those implementations, causing the voice wrapper response that is responsive to the spoken utterance to be audibly rendered for presentation to the given human user via the one or more speakers of the client device of the given human user may include: processing, using a text-to-speech (TTS) component, of the plurality of components, of the voice wrapper, the voice wrapper response to generate synthesized speech audio data that captures synthesized speech corresponding to an audible response for the voice wrapper response; and causing the audible response for the voice wrapper response that is responsive to the spoken utterance to be audibly rendered for presentation to the given human user via the one or more speakers of the client device of the given human user.

In additional or alternative versions of those implementations, determining to utilize the existing third-party text-based in responding to the spoken utterance may be in response to determining that the need does not exist to disambiguate the spoken utterance.

In some further versions of those implementations, the method may further include, in response to determining to utilize the existing third-party text-based chatbot in responding to the spoken utterance: processing, using the existing third-party text-based chatbot, the ASR output generated by the voice wrapper to generate an existing third-party text-based chatbot response that is responsive to the spoken utterance; and causing the existing third-party text-based chatbot response that is responsive to the spoken utterance to be audibly rendered for presentation to the given human user via the one or more speakers of the client device of the given human user.

In some yet further versions of those implementations, causing the existing third-party text-based chatbot response that is responsive to the spoken utterance to be audibly rendered for presentation to the given human user via the one or more speakers of the client device of the given human user may include: processing, using a text-to-speech (TTS) component, of the plurality of components, of the voice wrapper, the existing third-party text-based chatbot response to generate synthesized speech audio data that captures synthesized speech corresponding to an audible response for the existing third-party text-based chatbot response; and causing the audible response for the existing third-party text-based chatbot response that is responsive to the spoken utterance to be audibly rendered for presentation to the given human user via the one or more speakers of the client device of the given human user.

In some implementations, the plurality of components of the voice wrapper may include a plurality of input components and a plurality of output components.

In some versions of those implementations, the plurality of input components may include one or more of: an input detection component to determine whether the spoken utterance is directed to the existing third-party text-based chatbot; an automatic speech recognition (ASR) component to process the audio data that captures the spoken utterance to generate ASR output for the spoken utterance; a natural language understanding (NLU) component to process the ASR output to generate NLU output for the spoken utterance; a fulfillment component to process the ASR output for the spoken utterance and/or the NLU output for the spoken utterance to generate fulfillment output for the spoken utterance; a large language model (LLM) component to process the ASR output for the spoken utterance to generate LLM output for the spoken utterance; an endpointing component to determine when the human user is done providing the spoken utterance; a modification component to process the ASR output for the spoken utterance and/or the NLU output for the spoken utterance to generate voice wrapper output; an interruption component to process the ASR output for the spoken utterance and/or the NLU output for the spoken utterance to determine whether the spoken utterance is an interruption and/or a type of the interruption; or a disambiguation component to process the ASR output for the spoken utterance and/or the NLU output for the spoken utterance to determine whether to disambiguate the spoken utterance.

In additional or alternative versions of those implementations, the plurality of output components may include one or more of: a text-to-speech (TTS) component to generate synthesized speech audio data that captures synthesized speech corresponding to an audible response for an existing third-party text-based chatbot response; a personality component to cause the audible response to reflect a particular persona, from among a plurality of disparate personas, or a particular voice, from among a plurality of disparate voices; or a latency component to determine whether to cause pre-cached content to be audibly rendered while the existing third-party text-based chatbot response is being generated.

In some implementations, a method implemented by one or more processors is provided, and includes: receiving, from a first-party entity, a voice wrapper for an existing third-party text-based chatbot that is managed by a third-party entity, the third-party entity being distinct from the first-party entity, and the voice wrapper including a plurality of components to enable the existing third-party text-based chatbot to engage in corresponding voice-based conversations with corresponding human users; and causing the existing third-party text-based chatbot to engage in a given voice-based conversation with a given human user via a client device of the given human user. Causing the existing third-party text-based chatbot to engage in the given voice-based conversation with the given human user includes: receiving audio data that captures a spoken utterance provided by the given human user; processing, using an automatic speech recognition (ASR) component, from among the plurality of components, of the voice wrapper, the audio data that captures the spoken utterance to generate ASR output; determining, based on the ASR output, or natural language understanding (NLU) output, that is generated by the voice wrapper based on processing the ASR output, whether to generate voice wrapper output that is based on the ASR output but differs from the ASR output; and in response to determining to generate the voice wrapper output that is based on the ASR output but differs from the ASR output: processing, using a modification component, from among the plurality of components, of the voice wrapper, the ASR output to generate the voice wrapper output that is based on the ASR output but differs from the ASR output; processing, using the existing third-party text-based chatbot, the voice wrapper output to generate an existing third-party text-based chatbot response that is responsive to the spoken utterance; and causing the existing third-party text-based chatbot response that is responsive to the spoken utterance to be audibly rendered for presentation to the given human user via one or more speakers of the client device of the given human user.

These and other implementations of technology disclosed herein can optionally include one or more of the following features.

In some implementations, determining whether to generate the voice wrapper output that is based on the ASR output but differs from the ASR output and based on the ASR output or the NLU output may include: determining, based on the ASR output or the NLU output, whether the spoken utterance includes filler speech.

In some versions of those implementations, determining to generate the voice wrapper output that is based on the ASR output but differs from the ASR output may be in response to determining that the spoken utterance includes filler speech.

In some further versions of those implementations, processing the ASR output to generate the voice wrapper output that is based on the ASR output but differs from the ASR output may include: processing, using the modification component of the voice wrapper, the ASR output to remove the filler speech.

In additional or alternative versions of those implementations, determining to refrain from generating the voice wrapper output that is based on the ASR output but differs from the ASR output may be in response to determining that the spoken utterance does not include filler speech.

In some further versions of those implementations, the method may further include, in response to determining to refrain from generating the voice wrapper output that is based on the ASR output but differs from the ASR output: processing, using the existing third-party text-based chatbot, the ASR output to generate the existing third-party text-based chatbot response that is responsive to the spoken utterance; and causing the existing third-party text-based chatbot response that is responsive to the spoken utterance to be audibly rendered for presentation to the given human user via one or more speakers of the client device of the given human user.

In some implementations, determining whether to generate the voice wrapper output that is based on the ASR output but differs from the ASR output and based on the ASR output or the NLU output may include: determining, based on the ASR output or the NLU output, whether there is a need to bias the ASR output and/or the NLU output.

In some versions of those implementations, determining to generate the voice wrapper output that is based on the ASR output but differs from the ASR output may be in response to determining that there is a need to bias the ASR output and/or the NLU output.

In some further versions of those implementations, processing the ASR output to generate the voice wrapper output that is based on the ASR output but differs from the ASR output may include: processing, using the modification component of the voice wrapper, the ASR output and/or the NLU output to bias towards a particular interpretation to generate biased ASR output and/or biased NLU output.

In additional or alternative versions of those implementations, determining to refrain from generating the voice wrapper output that is based on the ASR output but differs from the ASR output may be in response to determining there is not a need to bias the ASR output and/or the NLU output.

In some further versions of those implementations, the method may further include, in response to determining to refrain from generating the voice wrapper output that is based on the ASR output but differs from the ASR output: processing, using the existing third-party text-based chatbot, the ASR output to generate the existing third-party text-based chatbot response that is responsive to the spoken utterance; and causing the existing third-party text-based chatbot response that is responsive to the spoken utterance to be audibly rendered for presentation to the given human user via one or more speakers of the client device of the given human user.

In some implementations, a method implemented by one or more processors is provided, and includes: receiving, from a first-party entity, a voice wrapper for an existing third-party text-based chatbot that is managed by a third-party entity, the third-party entity being distinct from the first-party entity, and the voice wrapper including a plurality of components to enable the existing third-party text-based chatbot to engage in corresponding voice-based conversations with corresponding human users; and causing the existing third-party text-based chatbot to engage in a given voice-based conversation with a given human user via a client device of the given human user. Causing the existing third-party text-based chatbot to engage in the given voice-based conversation with the given human user includes: receiving audio data that captures a spoken utterance provided by the given human user; processing, using an automatic speech recognition (ASR) component, from among the plurality of components, of the voice wrapper, the audio data that captures the spoken utterance to generate ASR output; processing, using the existing third-party text-based chatbot, the ASR output or voice wrapper output, that is generated by the voice wrapper based on processing the ASR output, to generate an existing third-party text-based chatbot response that is text-based and that is responsive to the spoken utterance; processing, using a text-to-speech (TTS) component, from among the plurality of components, of the voice wrapper, the existing third-party text-based chatbot response or a voice wrapper response, that is generated based on the existing third-party text-based chatbot response, to generate synthesized speech audio data that captures synthesized speech corresponding to an audible response for the existing third-party text-based chatbot, wherein the audible response reflects a given persona, from among a plurality of disparate personas, or a given voice, from among a plurality of disparate voices; and causing the audible response that is responsive to the spoken utterance to be audibly rendered for presentation to the given human user via one or more speakers of the client device of the given human user.

These and other implementations of technology disclosed herein can optionally include one or more of the following features.

In some implementations, the audible response for the existing third-party text-based chatbot may reflect the given persona from among the plurality of disparate personas.

In some versions of those implementations, the given persona may be specified by the user that provided the spoken utterance prior to providing the spoken utterance.

In some additional or alternative versions of those implementations, the method may further include, prior to processing the existing third-party text-based chatbot response that is text-based and that is responsive to the spoken utterance to generate synthesized speech audio data that captures synthesized speech corresponding to an audible response for the existing third-party text-based chatbot response that is text-based and that is responsive to the spoken utterance and using the TTS component: processing, using a personality component, of the plurality of components, of the voice wrapper, the existing third-party text-based chatbot response to generate the voice wrapper response that reflects the given persona and that differs from the existing third-party text-based chatbot response.

In some further versions of those implementations, the method may further include, subsequent to generating the voice wrapper response that reflects the given persona and that differs from the existing third-party text-based chatbot response: processing, using the TTS component of the voice wrapper, the voice wrapper response to generate the synthesized speech audio data that captures the synthesized speech corresponding to the audible response.

In some implementations, the audible response for the existing third-party text-based chatbot may reflect the given voice from among the plurality of disparate voices.

In some versions of those implementations, the given voice may be specified by the user that provided the spoken utterance prior to providing the spoken utterance.

In some additional or alternative versions of those implementations, processing the existing third-party text-based chatbot response to generate the synthesized speech audio data that captures the synthesized speech corresponding to the audible response for the existing third-party text-based chatbot and using the TTS component of the voice wrapper may include: selecting, using a personality component, of the plurality of components, of the voice wrapper, a corresponding set of prosodic properties for the given voice; and processing, using the TTS component of the voice wrapper, and along with the existing third-party text-based chatbot response, the corresponding set of prosodic properties to generate the audible response that reflects the given voice.

In some implementations, a method implemented by one or more processors is provided, and includes: receiving, from a first-party entity, a voice wrapper for an existing third-party text-based chatbot that is managed by a third-party entity, the third-party entity being distinct from the first-party entity, and the voice wrapper including a plurality of components to enable the existing third-party text-based chatbot to engage in corresponding voice-based conversations with corresponding human users; and causing the existing third-party text-based chatbot to engage in a given voice-based conversation with a given human user via a client device of the given human user. Causing the existing third-party text-based chatbot to engage in the given voice-based conversation with the given human user includes: receiving audio data that captures a spoken utterance provided by the given human user; processing, using an automatic speech recognition (ASR) component, from among the plurality of components, of the voice wrapper, the audio data that captures the spoken utterance to generate ASR output; determining, using a latency component, from among the plurality of components, of the voice wrapper, to cause pre-cached content to be audibly rendered for presentation to the given human user via one or more speakers of the client device of the given human user; causing the pre-cached content to be audibly rendered for presentation to the given human user via the one or more speakers of the client device of the given human user; while the pre-cached content is being audibly rendered for presentation to the given human: processing, using the existing third-party text-based chatbot, the ASR output or voice wrapper output, that is generated by the voice wrapper based on processing the ASR output, to generate an existing third-party text-based chatbot response that is text-based and that is responsive to the spoken utterance; processing, using a text-to-speech (TTS) component, from among the plurality of components, of the voice wrapper, the existing third-party text-based chatbot response that is text-based and that is responsive to the spoken utterance to generate synthesized speech audio data that captures synthesized speech to an audible response for the existing third-party text-based chatbot response that is text-based and that is responsive to the spoken utterance; and subsequent to the pre-cached content being audibly rendered for presentation to the given human: causing the audible response that is responsive to the spoken utterance to be audibly rendered for presentation to the given human user via the one or more speakers of the client device of the given human user.

These and other implementations of technology disclosed herein can optionally include one or more of the following features.

In some implementations, determining to cause the pre-cached content to be audibly rendered for presentation to the given human user via the one or more speakers of the client device of the given human user and using the latency component of the voice wrapper may include: determining, using the latency component of the voice wrapper, a predicted latency for generating the existing third-party text-based chatbot response that is text-based and that is responsive to the spoken utterance; and determining, based on the predicted latency satisfying a latency threshold, to cause the pre-cached content to be audibly rendered for presentation to the given human user via the one or more speakers of the client device of the given human user.

In some implementations, the method may further include, prior to causing the pre-cached content to be audibly rendered for presentation to the given human user via the one or more speakers of the client device of the given human user: causing, based on the ASR output and/or natural language understanding (NLU) output, that is generated based on the ASR output, the pre-cached content to be obtained; and causing, based on the ASR output and/or the NLU output, the pre-cached content to be tailored to the spoken utterance.

In some implementations, the pre-cached content and the audible response may be audibly perceived by the user as a single response to the spoken utterance.

In some implementations, a method implemented by one or more processors is provided, and includes: identifying, for an existing first-party text-based chatbot that is managed by a first-party entity, a voice wrapper for the existing first-party text-based chatbot that is also managed by the first-party entity, the voice wrapper including a plurality of components that enable the existing first-party text-based chatbot to engage in corresponding voice-based conversations with corresponding human users; and causing the existing first-party text-based chatbot to engage in a given voice-based conversation with a given human user via a client device of the given human user. Causing the existing first-party text-based chatbot to engage in the given voice-based conversation with the given human user includes: receiving audio data that captures a spoken utterance provided by the given human user; determining, based on processing the audio data that captures the spoken utterance and using one or more of the plurality of components of the voice wrapper, whether to utilize the voice wrapper in responding to the spoken utterance or the existing first-party text-based chatbot in responding to the spoken utterance; and in response to determining to utilize the voice wrapper in responding to the spoken utterance: processing, using one or more of the plurality of components of the voice wrapper and without using the existing first-party text-based chatbot, the audio data that captures the spoken utterance to generate a voice wrapper response that is responsive to the spoken utterance; and causing the voice wrapper response that is responsive to the spoken utterance to be audibly rendered for presentation to the given human user via one or more speakers of the client device of the given human user.

These and other implementations of technology disclosed herein can optionally include one or more of the following features.

In some implementations, the spoken utterance may be an interruption that interrupts a current response that is being audibly rendered for presentation to the given human user via the one or more speakers of the client device of the given human user, and determining whether to utilize the voice wrapper in responding to the spoken utterance or the existing first-party text-based chatbot in responding to the spoken utterance based on processing the audio data that captures the spoken utterance and using one or more of the plurality of components of the voice wrapper includes: processing, using an automatic speech recognition (ASR) component, of the plurality of components, of the voice wrapper, the audio data that captures the spoken utterance to generate ASR output that corresponds to the spoken utterance; processing, using an interruption component, of the plurality of components, of the voice wrapper, the ASR output, or natural language understanding (NLU) output, that is generated by the voice wrapper based on processing the ASR output, to determine a type of the interruption, from among a plurality of disparate types of interruptions; and determining, based on the type of interruption, whether to utilize the voice wrapper in responding to the spoken utterance or the existing first-party text-based chatbot in responding to the spoken utterance.

In some versions of those implementations, the plurality of disparate types of interruptions may include at least a non-critical interruption and a critical interruption.

In some further versions of those implementations, determining to utilize the voice wrapper in responding to the spoken utterance may be in response to determining that the type of interruption is the non-critical interruption.

In some yet further versions of those implementations, processing the audio data that captures the spoken utterance to generate the voice wrapper response that is responsive to the spoken utterance and using one or more of the plurality of components of the voice wrapper and without using the existing first-party text-based chatbot includes: processing, using a fulfillment component, of the plurality of components, of the voice wrapper, the ASR output and/or the NLU output, to generate the voice wrapper response that is responsive to the spoken utterance.

In some even yet further versions of those implementations, causing the voice wrapper response that is responsive to the spoken utterance to be audibly rendered for presentation to the given human user via the one or more speakers of the client device of the given human user may include: processing, using a text-to-speech (TTS) component, of the plurality of components, of the voice wrapper, the voice wrapper response to generate synthesized speech audio data that captures synthesized speech corresponding to an audible response for the voice wrapper response; ceasing the current response from being audibly rendered for presentation to the given human user via the one or more speakers of the client device of the given human user; and causing the audible response for the voice wrapper response that is responsive to the spoken utterance to be audibly rendered for presentation to the given human user via the one or more speakers of the client device of the given human user.

In additional or alternative further versions of those implementations, determining to utilize the existing first-party text-based in responding to the spoken utterance may be in response to determining that the type of interruption is the critical interruption.

In some yet further versions of those implementations, the method may further include, in response to determining to utilize the existing first-party text-based chatbot in responding to the spoken utterance: processing, using the existing first-party text-based chatbot, the ASR output generated by the voice wrapper to generate an existing first-party text-based chatbot response that is responsive to the spoken utterance; ceasing the current response from being audibly rendered for presentation to the given human user via the one or more speakers of the client device of the given human user; and causing the existing first-party text-based chatbot response that is responsive to the spoken utterance to be audibly rendered for presentation to the given human user via the one or more speakers of the client device of the given human user.

In some even yet further versions of those implementations, causing the existing first-party text-based chatbot response that is responsive to the spoken utterance to be audibly rendered for presentation to the given human user via the one or more speakers of the client device of the given human user may include: processing, using a text-to-speech (TTS) component, of the plurality of components, of the voice wrapper, the existing first-party text-based chatbot response to generate synthesized speech audio data that captures synthesized speech corresponding to an audible response for the existing first-party text-based chatbot response; and causing the audible response for the existing first-party text-based chatbot response that is responsive to the spoken utterance to be audibly rendered for presentation to the given human user via the one or more speakers of the client device of the given human user.

In additional or alternative even yet further versions of those implementations, the method may further include, while the existing first-party text-based chatbot is processing the ASR output generated by the voice wrapper to generate the existing first-party text-based chatbot response that is responsive to the spoken utterance: determining, using a latency component, from among the plurality of components, of the voice wrapper, to cause pre-cached content to be audibly rendered for presentation to the given human user via one or more speakers of the client device of the given human user; and causing the pre-cached content to be audibly rendered for presentation to the given human user via the one or more speakers of the client device of the given human user.

In some implementations, determining whether to utilize the voice wrapper in responding to the spoken utterance or the existing first-party text-based chatbot in responding to the spoken utterance based on processing the audio data that captures the spoken utterance and using one or more of the plurality of components of the voice wrapper may include: processing, using an automatic speech recognition (ASR) component, of the plurality of components, of the voice wrapper, the audio data that captures the spoken utterance to generate ASR output that corresponds to the spoken utterance; processing, using a disambiguation component, of the plurality of components, of the voice wrapper, the ASR output, or natural language understanding (NLU) output, that is generated by the voice wrapper based on processing the ASR output, to determine whether a need exists to disambiguate the spoken utterance; and determining, based on whether the need exists to disambiguate the spoken utterance, whether to utilize the voice wrapper in responding to the spoken utterance or the existing first-party text-based chatbot in responding to the spoken utterance.

In some versions of those implementations, determining to utilize the voice wrapper in responding to the spoken utterance may be in response to determining that the need exists to disambiguate the spoken utterance.

In some further versions of those implementations, processing the audio data that captures the spoken utterance to generate the voice wrapper response that is responsive to the spoken utterance and using one or more of the plurality of components of the voice wrapper and without using the existing first-party text-based chatbot may include: processing, using a fulfillment component, of the plurality of components, of the voice wrapper, the ASR output and/or the NLU output, to generate the voice wrapper response that is responsive to the spoken utterance.

In some yet further versions of those implementations, causing the voice wrapper response that is responsive to the spoken utterance to be audibly rendered for presentation to the given human user via the one or more speakers of the client device of the given human user may include: processing, using a text-to-speech (TTS) component, of the plurality of components, of the voice wrapper, the voice wrapper response to generate synthesized speech audio data that captures synthesized speech corresponding to an audible response for the voice wrapper response; and causing the audible response for the voice wrapper response that is responsive to the spoken utterance to be audibly rendered for presentation to the given human user via the one or more speakers of the client device of the given human user.

In additional or alternative versions of those implementations, determining to utilize the existing first-party text-based in responding to the spoken utterance may be in response to determining that the need does not exist to disambiguate the spoken utterance.

In some further versions of those implementations, the method may further include, in response to determining to utilize the existing first-party text-based chatbot in responding to the spoken utterance: processing, using the existing first-party text-based chatbot, the ASR output generated by the voice wrapper to generate an existing first-party text-based chatbot response that is responsive to the spoken utterance; and causing the existing first-party text-based chatbot response that is responsive to the spoken utterance to be audibly rendered for presentation to the given human user via the one or more speakers of the client device of the given human user.

In some yet further versions of those implementations, causing the existing first-party text-based chatbot response that is responsive to the spoken utterance to be audibly rendered for presentation to the given human user via the one or more speakers of the client device of the given human user may include: processing, using a text-to-speech (TTS) component, of the plurality of components, of the voice wrapper, the existing first-party text-based chatbot response to generate synthesized speech audio data that captures synthesized speech corresponding to an audible response for the existing first-party text-based chatbot response; and causing the audible response for the existing first-party text-based chatbot response that is responsive to the spoken utterance to be audibly rendered for presentation to the given human user via the one or more speakers of the client device of the given human user.

In some implementations, the plurality of components of the voice wrapper may include a plurality of input components and a plurality of output components.

In some versions of those implementations, the plurality of input components may include one or more of: an input detection component to process the audio data that captures the spoken utterance to determine whether the spoken utterance is directed to the existing first-party text-based chatbot; an automatic speech recognition (ASR) component to process the audio data that captures the spoken utterance to generate ASR output for the spoken utterance; a natural language understanding (NLU) component to process the ASR output to generate NLU output for the spoken utterance; a fulfillment component to process the ASR output for the spoken utterance and/or the NLU output for the spoken utterance to generate fulfillment output for the spoken utterance; a large language model (LLM) component to process the ASR output for the spoken utterance to generate LLM output for the spoken utterance; an endpointing engine to determine when the given human user is done providing the spoken utterance; a modification component to process the ASR output for the spoken utterance and/or the NLU output for the spoken utterance to generate voice wrapper output; an interruption component to process the ASR output for the spoken utterance and/or the NLU output for the spoken utterance to determine whether the spoken utterance is an interruption and/or a type of the interruption; or a disambiguation component to process the ASR output for the spoken utterance and/or the NLU output for the spoken utterance to determine whether to disambiguate the spoken utterance.

In additional or alternative versions of those implementations, the plurality of output components may include one or more of: a text-to-speech (TTS) component to generate synthesized speech audio data that captures synthesized speech corresponding to an audible response for an existing first-party text-based chatbot response; a personality component to cause the audible response to reflect a particular persona, from among a plurality of disparate personas, or a particular voice, from among a plurality of disparate voices; or a latency component to determine whether to cause pre-cached content to be audibly rendered while the existing first-party text-based chatbot response is being generated.

In some implementations, a method implemented by one or more processors is provided, and includes: identifying, for an existing first-party text-based chatbot that is managed by a first-party entity, a voice wrapper for the existing first-party text-based chatbot that is also managed by the first-party entity, the voice wrapper including a plurality of components that enable the existing first-party text-based chatbot to engage in corresponding voice-based conversations with corresponding human users; and causing the existing first-party text-based chatbot to engage in a given voice-based conversation with a given human user via a client device of the given human user. Causing the existing first-party text-based chatbot to engage in the given voice-based conversation with the given human user includes: receiving audio data that captures a spoken utterance provided by the given human user; processing, using an automatic speech recognition (ASR) component, from among the plurality of components, of the voice wrapper, the audio data that captures the spoken utterance to generate ASR output; processing, using the existing first-party text-based chatbot, the ASR output or voice wrapper output, that is generated by the voice wrapper based on processing the ASR output, to generate an existing first-party text-based chatbot response that is text-based and that is responsive to the spoken utterance; processing, using a text-to-speech (TTS) component, from among the plurality of components, of the voice wrapper, the existing first-party text-based chatbot response or a voice wrapper response, that is generated based on the existing first-party text-based chatbot response, to generate synthesized speech audio data that captures synthesized speech corresponding to an audible response for the existing first-party text-based chatbot; and causing the audible response that is responsive to the spoken utterance to be audibly rendered for presentation to the given human user via one or more speakers of the client device of the given human user. The audible response reflects a given persona, from among a plurality of disparate personas, or a given voice, from among a plurality of disparate voices.

These and other implementations of technology disclosed herein can optionally include one or more of the following features.

In some implementations, the audible response for the existing first-party text-based chatbot may reflect the given persona from among the plurality of disparate personas.

In some versions of those implementations, the given persona may be specified by the user that provided the spoken utterance prior to providing the spoken utterance.

In additional or alternative versions of those implementations, the method may further include, prior to processing the existing first-party text-based chatbot response that is text-based and that is responsive to the spoken utterance to generate synthesized speech audio data that captures synthesized speech corresponding to an audible response for the existing first-party text-based chatbot response that is text-based and that is responsive to the spoken utterance and using the TTS component: processing, using a personality component, of the plurality of components, of the voice wrapper, the existing first-party text-based chatbot response to generate the voice wrapper response that reflects the given persona and that differs from the existing first-party text-based chatbot response.

In some further versions of those implementations, the method may further include, subsequent to generating the voice wrapper response that reflects the given persona and that differs from the existing first-party text-based chatbot response: processing, using the TTS component of the voice wrapper, the voice wrapper response to generate the synthesized speech audio data that captures the synthesized speech corresponding to the audible response.

In some implementations, the audible response for the existing first-party text-based chatbot may reflect the given voice from among the plurality of disparate voices.

In some versions of those implementations, the given voice may be specified by the user that provided the spoken utterance prior to providing the spoken utterance.

In additional or alternative versions of those implementations, processing the existing first-party text-based chatbot response to generate the synthesized speech audio data that captures the synthesized speech corresponding to the audible response for the existing first-party text-based chatbot and using the TTS component of the voice wrapper may include: selecting, using a personality component, of the plurality of components, of the voice wrapper, a corresponding set of prosodic properties for the given voice; and processing, using the TTS component of the voice wrapper, and along with the existing first-party text-based chatbot response, the corresponding set of prosodic properties to generate the audible response that reflects the given voice.

In some implementations, a method implemented by one or more processors is provided, and includes: identifying, for an existing first-party text-based chatbot that is managed by a first-party entity, a voice wrapper for the existing first-party text-based chatbot that is also managed by the first-party entity, the voice wrapper including a plurality of components that enable the existing first-party text-based chatbot to engage in corresponding voice-based conversations with corresponding human users; and causing the existing first-party text-based chatbot to engage in a given voice-based conversation with a given human user via a client device of the given human user. Causing the existing first-party text-based chatbot to engage in the given voice-based conversation with the given human user includes: receiving audio data that captures a spoken utterance provided by the given human user; processing, using an automatic speech recognition (ASR) component, from among the plurality of components, of the voice wrapper, the audio data that captures the spoken utterance to generate ASR output; determining, using a latency component, from among the plurality of components, of the voice wrapper, to cause pre-cached content to be audibly rendered for presentation to the given human user via one or more speakers of the client device of the given human user; and causing the pre-cached content to be audibly rendered for presentation to the given human user via the one or more speakers of the client device of the given human user; while the pre-cached content is being audibly rendered for presentation to the given human: processing, using the existing first-party text-based chatbot, the ASR output or voice wrapper output, that is generated by the voice wrapper based on processing the ASR output, to generate an existing first-party text-based chatbot response that is text-based and that is responsive to the spoken utterance; processing, using a text-to-speech (TTS) component, from among the plurality of components, of the voice wrapper, the existing first-party text-based chatbot response that is text-based and that is responsive to the spoken utterance to generate synthesized speech audio data that captures synthesized speech to an audible response for the existing first-party text-based chatbot response that is text-based and that is responsive to the spoken utterance; and subsequent to the pre-cached content being audibly rendered for presentation to the given human: causing the audible response that is responsive to the spoken utterance to be audibly rendered for presentation to the given human user via the one or more speakers of the client device of the given human user.

These and other implementations of technology disclosed herein can optionally include one or more of the following features.

In some implementations, determining to cause the pre-cached content to be audibly rendered for presentation to the given human user via the one or more speakers of the client device of the given human user and using the latency component of the voice wrapper may include: determining, using the latency component of the voice wrapper, a predicted latency for generating the existing first-party text-based chatbot response that is text-based and that is responsive to the spoken utterance; and determining, based on the predicted latency satisfying a latency threshold, to cause the pre-cached content to be audibly rendered for presentation to the given human user via the one or more speakers of the client device of the given human user.

In some implementations, the method may further include, prior to causing the pre-cached content to be audibly rendered for presentation to the given human user via the one or more speakers of the client device of the given human user: causing, based on the ASR output and/or natural language understanding (NLU) output, that is generated based on the ASR output, the pre-cached content to be obtained; and causing, based on the ASR output and/or the NLU output, the pre-cached content to be tailored to the spoken utterance.

In some implementations, the pre-cached content and the audible response may be audibly perceived by the user as a single response to the spoken utterance.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

receiving, from a first-party entity, a voice wrapper for an existing third-party text-based chatbot that is managed by a third-party entity, the third-party entity being distinct from the first-party entity, and the voice wrapper including a plurality of components that enable the existing third-party text-based chatbot to engage in corresponding voice-based conversations with corresponding human users; and causing the existing third-party text-based chatbot to engage in a given voice-based conversation with a given human user via a client device of the given human user, wherein causing the existing third-party text-based chatbot to engage in the given voice-based conversation with the given human user comprises:

receiving audio data that captures a spoken utterance provided by the given human user, wherein the spoken utterance is an interruption that interrupts a current response that is being audibly rendered for presentation to the given human user via one or more speakers of the client device of the given human user;

determining, based on processing the audio data that captures the spoken utterance and using one or more of the plurality of components of the voice wrapper, whether to utilize the voice wrapper in responding to the spoken utterance or the existing third-party text-based chatbot in responding to the spoken utterance, wherein determining whether to utilize the voice wrapper in responding to the spoken utterance or the existing third-party text-based chatbot in responding to the spoken utterance based on processing the audio data that captures the spoken utterance and using one or more of the plurality of components of the voice wrapper comprises:

processing, using an automatic speech recognition (ASR) component, of the plurality of components, of the voice wrapper, the audio data that captures the spoken utterance to generate ASR output that corresponds to the spoken utterance;

processing, using an interruption component, of the plurality of components, of the voice wrapper, the ASR output, or natural language understanding (NLU) output, that is generated by the voice wrapper based on processing the ASR output, to determine a type of the interruption, from among a plurality of disparate types of interruptions; and determining, based on the type of interruption, whether to utilize the voice wrapper in responding to the spoken utterance or the existing third-party text-based chatbot in responding to the spoken utterance; and in response to determining to utilize the voice wrapper in responding to the spoken utterance:

processing, using one or more of the plurality of components of the voice wrapper and without using the existing third-party text-based chatbot, the audio data that captures the spoken utterance to generate a voice wrapper response that is responsive to the spoken utterance; and causing the voice wrapper response that is responsive to the spoken utterance to be audibly rendered for presentation to the given human user via the one or more speakers of the client device of the given human user.

2. The method of claim 1, wherein the plurality of disparate types of interruptions include at least a non-critical interruption and a critical interruption.

3. The method of claim 2, wherein determining to utilize the voice wrapper in responding to the spoken utterance is in response to determining that the type of interruption is the non-critical interruption.

4. The method of claim 3, wherein processing the audio data that captures the spoken utterance to generate the voice wrapper response that is responsive to the spoken utterance and using one or more of the plurality of components of the voice wrapper and without using the existing third-party text-based chatbot comprises:

processing, using a fulfillment component, of the plurality of components, of the voice wrapper, the ASR output and/or the NLU output, to generate the voice wrapper response that is responsive to the spoken utterance.

5. The method of claim 4, wherein causing the voice wrapper response that is responsive to the spoken utterance to be audibly rendered for presentation to the given human user via the one or more speakers of the client device of the given human user comprises:

processing, using a text-to-speech (TTS) component, of the plurality of components, of the voice wrapper, the voice wrapper response to generate synthesized speech audio data that captures synthesized speech corresponding to an audible response for the voice wrapper response;

ceasing the current response from being audibly rendered for presentation to the given human user via the one or more speakers of the client device of the given human user; and causing the audible response for the voice wrapper response that is responsive to the spoken utterance to be audibly rendered for presentation to the given human user via the one or more speakers of the client device of the given human user.

6. The method of claim 2, wherein determining to utilize the existing third-party text-based chatbot in responding to the spoken utterance is in response to determining that the type of interruption is the critical interruption.

7. The method of claim 6, further comprising:

in response to determining to utilize the existing third-party text-based chatbot in responding to the spoken utterance:

processing, using the existing third-party text-based chatbot, the ASR output generated by the voice wrapper to generate an existing third-party text-based chatbot response that is responsive to the spoken utterance;

ceasing the current response from being audibly rendered for presentation to the given human user via the one or more speakers of the client device of the given human user; and causing the existing third-party text-based chatbot response that is responsive to the spoken utterance to be audibly rendered for presentation to the given human user via the one or more speakers of the client device of the given human user.

8. The method of claim 7, wherein causing the existing third-party text-based chatbot response that is responsive to the spoken utterance to be audibly rendered for presentation to the given human user via the one or more speakers of the client device of the given human user comprises:

processing, using a text-to-speech (TTS) component, of the plurality of components, of the voice wrapper, the existing third-party text-based chatbot response to generate synthesized speech audio data that captures synthesized speech corresponding to an audible response for the existing third-party text-based chatbot response; and causing the audible response for the existing third-party text-based chatbot response that is responsive to the spoken utterance to be audibly rendered for presentation to the given human user via the one or more speakers of the client device of the given human user.

9. The method of claim 7, further comprising:

while the existing third-party text-based chatbot is processing the ASR output generated by the voice wrapper to generate the existing third-party text-based chatbot response that is responsive to the spoken utterance:

determining, using a latency component, from among the plurality of components, of the voice wrapper, to cause pre-cached content to be audibly rendered for presentation to the given human user via one or more speakers of the client device of the given human user; and causing the pre-cached content to be audibly rendered for presentation to the given human user via the one or more speakers of the client device of the given human user.

10. The method of claim 1, wherein the plurality of components of the voice wrapper include a plurality of input components and a plurality of output components.

11. A system comprising:

one or more hardware processors; and memory storing instructions that, when executed by the one or more hardware processors, the one or more hardware processors are operable to:

receive, from a first-party entity, a voice wrapper for an existing third-party text-based chatbot that is managed by a third-party entity, the third-party entity being distinct from the first-party entity, and the voice wrapper including a plurality of components that enable the existing third-party text-based chatbot to engage in corresponding voice-based conversations with corresponding human users; and cause the existing third-party text-based chatbot to engage in a given voice-based conversation with a given human user via a client device of the given human user, wherein, in causing the existing third-party text-based chatbot to engage in the given voice-based conversation with the given human user, the one or more hardware processors are operable to:

receive audio data that captures a spoken utterance provided by the given human user;

determine, based on processing the audio data that captures the spoken utterance and using one or more of the plurality of components of the voice wrapper, whether to utilize the voice wrapper in responding to the spoken utterance or the existing third-party text-based chatbot in responding to the spoken utterance, wherein, in determining whether to utilize the voice wrapper in responding to the spoken utterance or the existing third-party text-based chatbot in responding to the spoken utterance based on processing the audio data that captures the spoken utterance and using one or more of the plurality of components of the voice wrapper, the one or more hardware processors are further operable to:

process, using an automatic speech recognition (ASR) component, of the plurality of components, of the voice wrapper, the audio data that captures the spoken utterance to generate ASR output that corresponds to the spoken utterance;

process, using a disambiguation component, of the plurality of components, of the voice wrapper, the ASR output, or natural language understanding (NLU) output, that is generated by the voice wrapper based on processing the ASR output, to determine whether a need exists to disambiguate the spoken utterance; and determine, based on whether the need exists to disambiguate the spoken utterance, whether to utilize the voice wrapper in responding to the spoken utterance or the existing third-party text-based chatbot in responding to the spoken utterance; and in response to determining to utilize the voice wrapper in responding to the spoken utterance:

process, using one or more of the plurality of components of the voice wrapper and without using the existing third-party text-based chatbot, the audio data that captures the spoken utterance to generate a voice wrapper response that is responsive to the spoken utterance; and cause the voice wrapper response that is responsive to the spoken utterance to be audibly rendered for presentation to the given human user via one or more speakers of the client device of the given human user.

12. The system of claim 11, wherein determining to utilize the voice wrapper in responding to the spoken utterance is in response to determining that the need exists to disambiguate the spoken utterance.

13. The system of claim 12, wherein, in processing the audio data that captures the spoken utterance to generate the voice wrapper response that is responsive to the spoken utterance and using one or more of the plurality of components of the voice wrapper and without using the existing third-party text-based chatbot, the one or more hardware processors are further operable to:

process, using a fulfillment component, of the plurality of components, of the voice wrapper, the ASR output and/or the NLU output, to generate the voice wrapper response that is responsive to the spoken utterance.

14. The system of claim 13, wherein, in causing the voice wrapper response that is responsive to the spoken utterance to be audibly rendered for presentation to the given human user via the one or more speakers of the client device of the given human user, the one or more hardware processors are further operable to:

process, using a text-to-speech (TTS) component, of the plurality of components, of the voice wrapper, the voice wrapper response to generate synthesized speech audio data that captures synthesized speech corresponding to an audible response for the voice wrapper response; and cause the audible response for the voice wrapper response that is responsive to the spoken utterance to be audibly rendered for presentation to the given human user via the one or more speakers of the client device of the given human user.

15. The system of claim 11, wherein determining to utilize the existing third-party text-based chatbot in responding to the spoken utterance is in response to determining that the need does not exist to disambiguate the spoken utterance.

16. The system of claim 15, wherein the one or more hardware processors are further operable to:

in response to determining to utilize the existing third-party text-based chatbot in responding to the spoken utterance:

process, using the existing third-party text-based chatbot, the ASR output generated by the voice wrapper to generate an existing third-party text-based chatbot response that is responsive to the spoken utterance; and cause the existing third-party text-based chatbot response that is responsive to the spoken utterance to be audibly rendered for presentation to the given human user via the one or more speakers of the client device of the given human user.

17. The system of claim 16, wherein, in causing the existing third-party text-based chatbot response that is responsive to the spoken utterance to be audibly rendered for presentation to the given human user via the one or more speakers of the client device of the given human user, the one or more hardware processors are further operable to:

process, using a text-to-speech (TTS) component, of the plurality of components, of the voice wrapper, the existing third-party text-based chatbot response to generate synthesized speech audio data that captures synthesized speech corresponding to an audible response for the existing third-party text-based chatbot response; and cause the audible response for the existing third-party text-based chatbot response that is responsive to the spoken utterance to be audibly rendered for presentation to the given human user via the one or more speakers of the client device of the given human user.

18. The system of claim 11, wherein the plurality of components of the voice wrapper include a plurality of input components and a plurality of output components.

19. A non-transitory computer-readable medium comprising computer-executable instructions that, when executed by one or more processors, cause the one or more processors to perform operations to:

receive, from a first-party entity, a voice wrapper for an existing third-party text-based chatbot that is managed by a third-party entity, the third-party entity being distinct from the first-party entity, and the voice wrapper including a plurality of components that enable the existing third-party text-based chatbot to engage in corresponding voice-based conversations with corresponding human users; and cause the existing third-party text-based chatbot to engage in a given voice-based conversation with a given human user via a client device of the given human user, wherein the operations to cause the existing third-party text-based chatbot to engage in the given voice-based conversation with the given human user comprise operations to:

receive audio data that captures a spoken utterance provided by the given human user, wherein the spoken utterance is an interruption that interrupts a current response that is being audibly rendered for presentation to the given human user via one or more speakers of the client device of the given human user;

determine, based on processing the audio data that captures the spoken utterance and using one or more of the plurality of components of the voice wrapper, whether to utilize the voice wrapper in responding to the spoken utterance or the existing third-party text-based chatbot in responding to the spoken utterance, wherein, in determining whether to utilize the voice wrapper in responding to the spoken utterance or the existing third-party text-based chatbot in responding to the spoken utterance based on processing the audio data that captures the spoken utterance and using one or more of the plurality of components of the voice wrapper, the operations are further to:

process, using an automatic speech recognition (ASR) component, of the plurality of components, of the voice wrapper, the audio data that captures the spoken utterance to generate ASR output that corresponds to the spoken utterance;

process, using an interruption component, of the plurality of components, of the voice wrapper, the ASR output, or natural language understanding (NLU) output, that is generated by the voice wrapper based on processing the ASR output, to determine a type of the interruption, from among a plurality of disparate types of interruptions; and determine, based on the type of interruption, whether to utilize the voice wrapper in responding to the spoken utterance or the existing third-party text-based chatbot in responding to the spoken utterance; and in response to determining to utilize the voice wrapper in responding to the spoken utterance:

process, using one or more of the plurality of components of the voice wrapper and without using the existing third-party text-based chatbot, the audio data that captures the spoken utterance to generate a voice wrapper response that is responsive to the spoken utterance; and cause the voice wrapper response that is responsive to the spoken utterance to be audibly rendered for presentation to the given human user via the one or more speakers of the client device of the given human user.

* * * * *